US012101020B2

(12) United States Patent
Huang et al.

(10) Patent No.: US 12,101,020 B2
(45) Date of Patent: Sep. 24, 2024

(54) MULTI-MODE POWER SYSTEM AND POWER CONVERSION CIRCUIT THEREOF

(71) Applicant: Richtek Technology Corporation, Zhubei (TW)

(72) Inventors: Tsung-Wei Huang, Taipei (TW); Shui-Mu Lin, Taichung (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 243 days.

(21) Appl. No.: 17/929,733

(22) Filed: Sep. 5, 2022

(65) Prior Publication Data

US 2023/0102466 A1 Mar. 30, 2023

Related U.S. Application Data

(60) Provisional application No. 63/249,463, filed on Sep. 28, 2021.

(30) Foreign Application Priority Data

May 4, 2022 (TW) .................................. 111116851

(51) Int. Cl.
*H02M 3/158* (2006.01)
*H02J 7/00* (2006.01)
*H02M 1/00* (2006.01)
*H02M 3/07* (2006.01)

(52) U.S. Cl.
CPC ........... *H02M 1/0095* (2021.05); *H02J 7/007* (2013.01); *H02M 1/008* (2021.05); *H02M 3/07* (2013.01); *H02M 3/1582* (2013.01)

(58) Field of Classification Search
CPC ...... H02M 1/0095; H02M 1/008; H02M 3/07; H02M 3/072; H02M 3/158; H02M 3/1582; H02J 7/0014; H02J 7/0068; H02J 7/007; H02J 7/02; H02J 7/04; H02J 7/06; H02J 2207/20
See application file for complete search history.

(56) References Cited

U.S. PATENT DOCUMENTS

| 11,424,629 | B1 * | 8/2022 | Han | ..................... | H01M 10/441 |
| 2021/0067041 | A1 * | 3/2021 | Cho | ....................... | H02M 3/156 |
| 2022/0224124 | A1 * | 7/2022 | Liang | ..................... | H02J 7/0016 |
| 2022/0278617 | A1 * | 9/2022 | Liu | ....................... | H02J 7/00712 |
| 2023/0026736 | A1 * | 1/2023 | Liu | ....................... | H02M 1/0095 |

* cited by examiner

*Primary Examiner* — Alex Torres-Rivera
(74) *Attorney, Agent, or Firm* — Tung & Associates

(57) ABSTRACT

A multi-mode power system includes a battery module, a first conversion circuit, and a second conversion circuit. The battery module includes a battery path switch and a battery group. The first conversion circuit includes switches and a first capacitor, wherein the switches include the battery path switch. The multi-mode power system operates in one of plural operation mode combinations, wherein when the first conversion circuit operates in a first outgoing mode or a first bypass mode, the second conversion circuit operates in a second incoming mode, a second outgoing mode, or a second bypass mode; when the first conversion circuit operates in a first incoming mode, the second conversion circuit operates in the second incoming mode or the second bypass mode.

30 Claims, 10 Drawing Sheets

MULTI-MODE POWER SYSTEM AND POWER CONVERSION CIRCUIT THEREOF

CROSS REFERENCE

The present invention claims priority to U.S. 63/249,463 filed on Sep. 28, 2021 and claims priority to TW 111116851 filed on May 4, 2022.

BACKGROUND OF THE INVENTION

Field of Invention

The present invention relates to a power system; particularly, it relates to a multi-mode power system. The present invention also relates to a power conversion circuit for use in such multi-mode power system.

Description of Related Art

Please refer to FIG. 1, which shows a schematic diagram of a conventional power system 100. The power system 100 converts an external power supply 50 to a system power for suppling power to an internal system 90. The external power supply 50 has a voltage VBUS, whereas, the system power has a system voltage VSYS. As shown in FIG. 1, the power system 100 includes: a buck-boost converter 110, a battery module 120 and a buck converter 130. In a situation where the power system 100 adopts for example two battery cells, the buck converter 130 converts an intermediate voltage VMID having a relatively greater voltage level to a system power (corresponding to the system voltage VSYS) having a relatively smaller voltage level, for charging an internal system 90. The buck-boost converter 110 can execute bidirectional conversion between the system voltage VSYS and the intermediate voltage VMID, wherein the system voltage VSYS can be greater than, equal to, or smaller than the intermediate voltage VMID.

The prior art power system 100 shown in FIG. 1 has a drawback that: the prior art power system 100 uses too many devices. The buck-boost converter 110 uses switches Qp1-Qp4 and an inductor L1; the buck converter 130 uses switches QU and QL and an inductor L2; and a dedicated battery path switch QPP is required for controlling the electrical connection path between the battery group BAT and the intermediate voltage VMID. As a result, the prior art power system 100 costs high and has a relatively larger size; the many devices cause a relatively higher power loss.

Please refer to FIG. 2, which shows a schematic diagram of another conventional power system 102. As shown in FIG. 2, the power system 102 includes: a buck-boost converter 110, a battery module 120 and a divided-by-2 converter 140. The divided-by-2 converter 140 converts an external power supply 50 having a relatively greater voltage level to a system power having a relatively smaller voltage level, for charging an internal system 90. The prior art shown in FIG. 2 has the following drawback. As compared to the prior art power system 100 shown in FIG. 1, although the divided-by-2 converter 140 adopts a capacitive switching converter which reduces the unwanted power loss to a certain extent, the divided-by-2 converter 140 needs to use more components such as the switches Qp5-Qp8 and the capacitor CFLY, so the prior art power system 102 still has the problems of higher power loss, larger size and higher cost.

In view of the above, to overcome the drawbacks in the prior art, the present invention proposes a multi-mode power system adopting fewer devices, which will reduce the entire power consumption, circuit size and manufacturing cost.

SUMMARY OF THE INVENTION

From one perspective, the present invention provides a multi-mode power system, comprising: a battery module including: a battery path switch and a battery group which are connected in series to each other, wherein the battery group includes at least one battery; a first conversion circuit including: a plurality of switches and a first capacitor, wherein the plurality of switches are configured to operably switch a coupling relationship between the first capacitor and an internal system and a coupling relationship between the first capacitor and the battery module, so as to convert a power of the battery group to a system power, or, so as to convert the system power to the power of the battery group, wherein the plurality of switches of the first conversion circuit include the battery path switch, and wherein the system power is a direct current (DC) power, which is configured to operably supply power to the internal system; and a second conversion circuit including: another plurality of switches and an inductor, wherein the another plurality of switches are configured to operably switch a coupling relationship between the inductor and an external power supply and a coupling relationship between the inductor and the internal system, so as to convert the external power supply to the system power, or, so as to convert the system power to the external power supply; wherein the multi-mode power system operates in one of the following operation mode combinations: wherein when the first conversion circuit operates in a first outgoing mode or a first bypass mode, the second conversion circuit operates in a second incoming mode, a second outgoing mode or a second bypass mode; and wherein when the first conversion circuit operates in a first incoming mode, the second conversion circuit operates in the second incoming mode or the second bypass mode; wherein when the first conversion circuit operates in the first incoming mode, the plurality of switches periodically switch the coupling relationship between the first capacitor and the internal system and the coupling relationship between the first capacitor and the battery module, so as to convert the system power to the power of the battery group; wherein when the first conversion circuit operates in the first bypass mode, a part of the plurality of switches are always ON, so that a path between the system power and the power of the battery group is always ON, wherein the part of the plurality of switches include the battery path switch; wherein when the second conversion circuit operates in the second outgoing mode, the another plurality of switches periodically switch the coupling relationship between the inductor and the external power supply and the coupling relationship between the inductor and the internal system, so as to convert the system power to the external power supply; wherein when the second conversion circuit operates in the second incoming mode, the another plurality of switches periodically switch the coupling relationship between the inductor and the external power supply and the coupling relationship between the inductor and the internal system, so as to convert the external power supply to the system power; and wherein when the second conversion circuit operates in the second bypass mode, a part of the another plurality of switches are always ON, so that a path between the system power and the external power supply is always ON.

In one embodiment, the system power includes a system voltage. A voltage of the battery group is greater than or equal to the system voltage; a voltage of the external power supply is greater than or equal to the system voltage; the voltage of external power supply is greater than or equal to or smaller than the voltage of the battery group.

In one embodiment, when the first conversion circuit operates in the first incoming mode, the first conversion circuit is a charge pump, so that the voltage of the battery group is greater than the system voltage; and when the first conversion circuit operates in the first outgoing mode, the first conversion circuit is a capacitive voltage-divider circuit, so that the voltage of the battery group is greater than the system voltage.

In one embodiment, the voltage of the battery group is 2-fold of the system voltage.

In one embodiment, the first conversion circuit is a Dickson converter, wherein the voltage of the battery group is 2-fold, 3-fold or 4-fold of the system voltage.

In one embodiment, when the second conversion circuit operates in the second incoming mode, the second conversion circuit is a buck converter, so that the voltage of external power supply is greater than the system voltage; and when the second conversion circuit operates in the second outgoing mode, the second conversion circuit is a boost converter, so that the voltage of external power supply is greater than the system voltage.

In one embodiment, the second conversion circuit executes conversion between the external power supply and the system power by at least 2-level pulse width modulation.

In one embodiment, the plurality of switches of the first conversion circuit and the another plurality of switches of the second conversion circuit are synchronously switched, wherein a duty ratio of the plurality of switches of the first conversion circuit is correlated to a duty ratio of the another plurality of switches of the second conversion circuit.

In one embodiment, the operation mode combinations further include: wherein when the first conversion circuit operates in a first OFF mode, the second conversion circuit operates in a second OFF mode, a second incoming mode or a second bypass mode; and wherein when the second conversion circuit operates in a second OFF mode, the first conversion circuit operates in the first outgoing mode or the first bypass mode; wherein when the first conversion circuit operates in the first OFF mode, the plurality of switches of the first conversion circuit are always OFF; and wherein when the second conversion circuit operates in the second OFF mode, the another plurality of switches of the second conversion circuit are always OFF.

In one embodiment, the plurality of switches of the first conversion circuit include: a first switch having a first control end, a first opposite-phase output end and a first in-phase output end, wherein the first opposite-phase output end is coupled to the battery group; a second switch having a second control end, a second opposite-phase output end and a second in-phase output end, wherein the second opposite-phase output end is coupled to the first in-phase output end, wherein the second in-phase output end is coupled to the internal system; a third switch having a third control end, a third opposite-phase output end and a third in-phase output end, wherein the third opposite-phase output end is coupled between the second in-phase output end and the internal system; a fourth switch having a fourth control end, a fourth opposite-phase output end and a fourth in-phase output end, wherein the fourth opposite-phase output end is coupled to the third in-phase output end, wherein the fourth in-phase output end is coupled to ground; wherein a first end of the first capacitor is coupled between the first in-phase output end and the second opposite-phase output end, wherein a second end of the first capacitor is coupled between the third in-phase output end and the fourth opposite-phase output end; wherein the first conversion circuit further includes: a first control circuit, which is configured to operably generate a first control signal, a second control signal, a third control signal, a fourth control signal, so as to control the first switch, the second switch, the third switch and the fourth switch, respectively; and wherein the first switch is the battery path switch.

In one embodiment, the first control circuit is configured to operate the plurality of switches via one or more of the following approaches: wherein when the first conversion circuit operates in the first bypass mode, the first switch and the second switch are always ON, whereas, the third switch and the fourth switch are always OFF; wherein when the first conversion circuit operates in the first outgoing mode or the first incoming mode, the first switch, the second switch, the third switch and the fourth switch are periodically switched between an ON state and an Off state, wherein when the first switch and the third switch are ON, the second switch and the fourth switch are OFF, and wherein when the first switch and the third switch are OFF, the second switch and the fourth switch are ON; and/or wherein when the first conversion circuit operates in the first OFF mode, the first switch and the second switch are always OFF.

In one embodiment, the another plurality of switches of second conversion circuit include: a fifth switch having a fifth control end, a fifth opposite-phase output end and a fifth in-phase output end, wherein the fifth in-phase output end is coupled to ground; a sixth switch having a sixth control end, a sixth opposite-phase output end and a sixth in-phase output end, wherein the sixth opposite-phase output end is coupled to the external power supply, wherein the sixth in-phase output end is coupled to the fifth opposite-phase output end; wherein a first end of the inductor is coupled between the sixth in-phase output end and the fifth opposite-phase output end, wherein a second end of the inductor is coupled among the second in-phase output end, the third opposite-phase output end and the internal system; and wherein the second conversion circuit further includes: a second control circuit, which is configured to operably generate a fifth control signal and a sixth control signal, so as to control the fifth switch and the sixth switch, respectively.

In one embodiment, the second control circuit is configured to operate the another plurality of switches via one or more of the following approaches: wherein when the second conversion circuit operates in the first bypass mode, the sixth switch is always ON, whereas the fifth switch is always OFF; wherein when the second conversion circuit operates in the second outgoing mode or the second incoming mode, the fifth switch and the sixth switch are periodically switched between an ON state and an Off state; wherein when the fifth switch is ON, the sixth switch is OFF; wherein when the fifth switch is OFF, the sixth switch is ON; and/or wherein when the second conversion circuit operates in a second OFF mode, the fifth switch and the sixth switch are always OFF.

In one embodiment, the another plurality of switches of second conversion circuit include: a seventh switch having a seventh control end, a seventh opposite-phase output end and a seventh in-phase output end, wherein the seventh opposite-phase output end is coupled to the fifth in-phase output end, wherein in-phase output end is coupled to ground; an eighth switch having a eighth control end, an eighth opposite-phase output end and an eighth in-phase output end, wherein the eighth in-phase output end is coupled to the sixth opposite-phase output end; and a second capacitor, wherein a first end of the second capacitor is coupled between the eighth in-phase output end and the sixth opposite-phase output end, wherein a second end of the second capacitor is coupled between the fifth in-phase output end and the seventh opposite-phase output end; wherein the second control circuit is configured to operably generate a seventh control signal and an eighth control signal, so as to control the seventh switch and the eighth switch, respectively.

In one embodiment, the second control circuit is configured to operate the another plurality of switches further via one or more of the following approaches: wherein when the second conversion circuit operates in the second bypass mode, the sixth switch and the eighth switch are always ON, whereas the fifth switch and the seventh switch are always OFF; wherein when the second conversion circuit operates in the second outgoing mode or the second incoming mode, the fifth switch, the sixth switch, the seventh switch and the eighth switch are periodically switched between an ON state and an Off state; wherein when the fifth switch and the eighth switch are ON, the sixth switch and the seventh switch are OFF; wherein when the fifth switch and the eighth switch are OFF, the sixth switch and the seventh switch are ON; and/or wherein when the second conversion circuit operates in the second OFF mode, the fifth switch, the sixth switch, the seventh switch and the eighth switch are always OFF.

From another perspective, the present invention provides a power conversion circuit for use in a multi-mode power system, wherein the multi-mode power system includes: a first capacitor, an inductor and a battery group which are coupled to the power conversion circuit; the power conversion circuit comprising: a battery sub-module including: a battery path switch and the battery group which are connected in series to each other; a first conversion sub-circuit including a plurality of switches, wherein the plurality of switches are configured to operably switch a coupling relationship between the first capacitor and an internal system and a coupling relationship between the first capacitor and the battery module, so as to convert a power of the battery group to a system power for being supplied to the internal system, or, so as to convert the system power to the power of the battery group, wherein the plurality of switches of the first conversion circuit include the battery path switch; and a second conversion sub-circuit including: another plurality of switches, wherein the another plurality of switches are configured to operably switch a coupling relationship between the inductor and an external power supply and a coupling relationship between the inductor and the internal system, so as to convert the external power supply to the system power, or, so as to convert the system power to the external power supply, wherein the system power is a direct current (DC) power, which is configured to operably supply power to the internal system; wherein the power conversion circuit operates in one of a plurality of following operation mode combinations: wherein when the first conversion sub-circuit operates in a first outgoing mode or a first bypass mode, the second conversion sub-circuit operates in a second incoming mode, a second outgoing mode or a second bypass mode; and wherein when the first conversion sub-circuit operates in a first incoming mode, the second conversion sub-circuit operates in the second incoming mode or the second bypass mode; wherein when the first conversion sub-circuit operates in the first incoming mode, the plurality of switches periodically switch the coupling relationship between the first capacitor and the internal system and the coupling relationship between the first capacitor and the battery module, so as to convert the system power to the power of the battery group; wherein when the first conversion sub-circuit operates in the first bypass mode, a part of the plurality of switches are always ON, so that a path between the system power and the power of the battery group is always ON, wherein part of the plurality of switches include the battery path switch; wherein when the second conversion sub-circuit operates in the second outgoing mode, the another plurality of switches periodically switch the coupling relationship between the inductor and the external power supply and the coupling relationship between the inductor and the internal system, so as to convert the system power to the external power supply; wherein when the second conversion sub-circuit operates in the second incoming mode, the another plurality of switches periodically switch the coupling relationship between the inductor and the external power supply and the coupling relationship between the inductor and the internal system, so as to convert the external power supply to the system power; and wherein when the second conversion sub-circuit operates in the second bypass mode, a part of the another plurality of switches are always ON, so that a path between the system power and the external power supply is always ON.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 3:
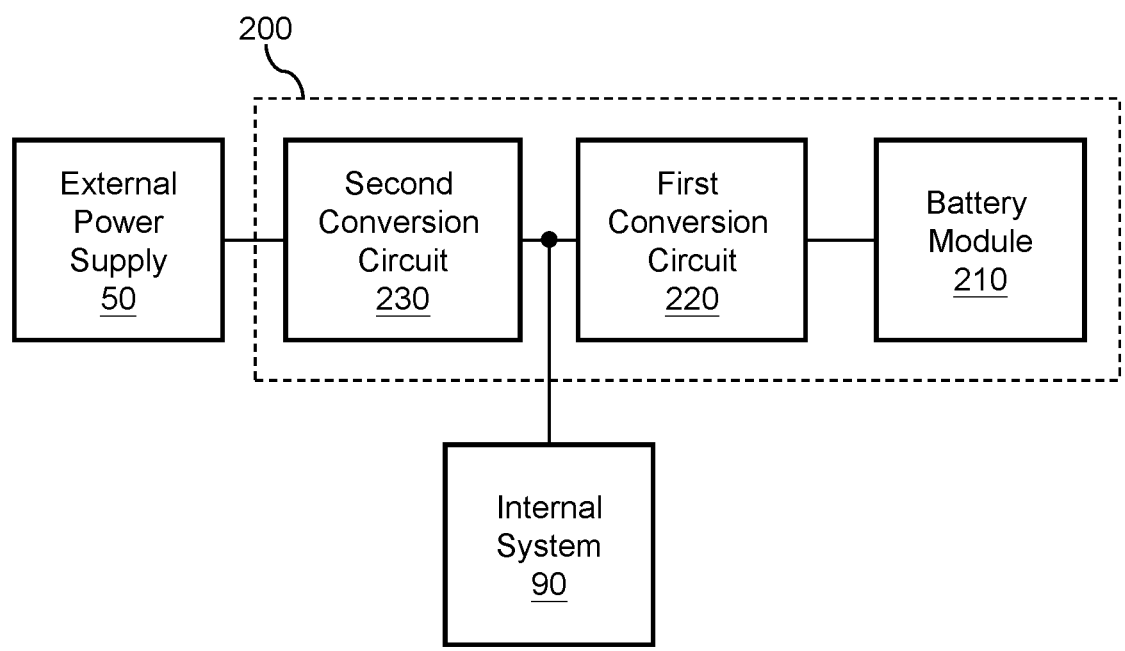
FIG. 3 shows a schematic circuit block diagram of a multi-mode power system according to an embodiment of the present invention.

Please refer to FIG. 3, which shows a schematic circuit block diagram of a multi-mode power system 200 according to an embodiment of the present invention. As shown in FIG. 3, the multi-mode power system 200 comprises: a battery module 210, a first conversion circuit 220 and a second conversion circuit 230. The battery module 210 includes: a battery path switch and a battery group which are connected in series to each other, wherein the battery group includes at least one battery. The first conversion circuit 220 includes switches and a first capacitor, whereas, the second conversion circuit 230 includes switches and an inductor. In other words, in this embodiment, the first conversion circuit 220 is a capacitive switching converter, whereas, the second conversion circuit 230 an inductive switching converter. In one embodiment, the switches are configured to operably switch coupling relationships between the first capacitor and an internal system 90 and between the first capacitor and the battery module 210, so as to convert a power of the battery group to a system power (corresponding to a system voltage VSYS) which is supplied to the internal system 90, or, so as to convert the system power to the power of the battery group, so that the battery group can be charged via the power of the battery group. The first conversion circuit 220 and the battery module 210 share the battery path switch. In one embodiment, the switches are configured to operably switch a coupling relationship between the inductor and an external power supply 50 and a coupling relationship between the inductor and the internal system 90, so as to convert the external power supply 50 to the system power, or, so as to convert the system power to the external power supply 50, wherein the system power is a DC power, which is configured to operably supply power to the internal system 90.

Please refer to Table 1, which shows a table of operation mode combinations of the first conversion circuit 220 and the second conversion circuit 230 of the multi-mode power system 200 according to an embodiment of the present invention. In the table, the label "O" indicates that the combination of operation modes is functional, whereas, the label "X" indicates that the combination of operation modes is not functional. In one embodiment, the multi-mode power system 200 operates in one of the functional operation mode combinations shown in Table 1. Referring to Table 1, the first conversion circuit 220 has three operation modes including a first incoming mode, a first outgoing mode and a first bypass mode, and the second conversion circuit 230 has three operation modes including a second incoming mode, a second outgoing mode and a second bypass mode. When the first conversion circuit 220 operates in the first outgoing mode or the first bypass mode, the second conversion circuit 230 can operate in the second incoming mode, the second outgoing mode or the second bypass mode. When the first conversion circuit 220 operates in the first incoming mode, the second conversion circuit 230 can operate in the second incoming mode or the second bypass mode.

TABLE 1

| Mode | First Incoming Mode | First Outgoing Mode | First Bypass Mode |
|---|---|---|---|
| Second Incoming Mode | O | O | O |
| Second Outgoing Mode | X | O | O |
| Second Bypass Mode | O | O | O |

Please refer to Table 2, which shows a table of operation mode combinations of the first conversion circuit 220 and the second conversion circuit 230 of the multi-mode power system 200 according to another embodiment of the present invention. As shown in Table 2, in one embodiment, the first conversion circuit 220 further has a first OFF mode, whereas, the second conversion circuit 230 further has a second OFF mode, so that the multi-mode power system 200 can operate in even more operation mode combinations. When the first conversion circuit 220 operates in the first OFF mode, the second conversion circuit 230 can operate in the second OFF mode, the second incoming mode or the second bypass mode. When the second conversion circuit 230 operates in the second OFF mode, the first conversion circuit 220 can operate in the first outgoing mode or the first bypass mode. In the following description, the multi-mode power system 200 will be exemplified by a multi-mode power system 300 to explain the circuit configuration, functions and operation mechanisms in respective operation mode combinations.

TABLE 2

| Mode | First Incoming Mode | First Outgoing Mode | First Bypass Mode | First OFF Mode |
|---|---|---|---|---|
| Second Incoming Mode | O | O | O | O |
| Second Outgoing Mode | X | O | O | X |
| Second Bypass Mode | O | O | O | O |
| Second OFF Mode | X | O | O | O |

Figure 4:
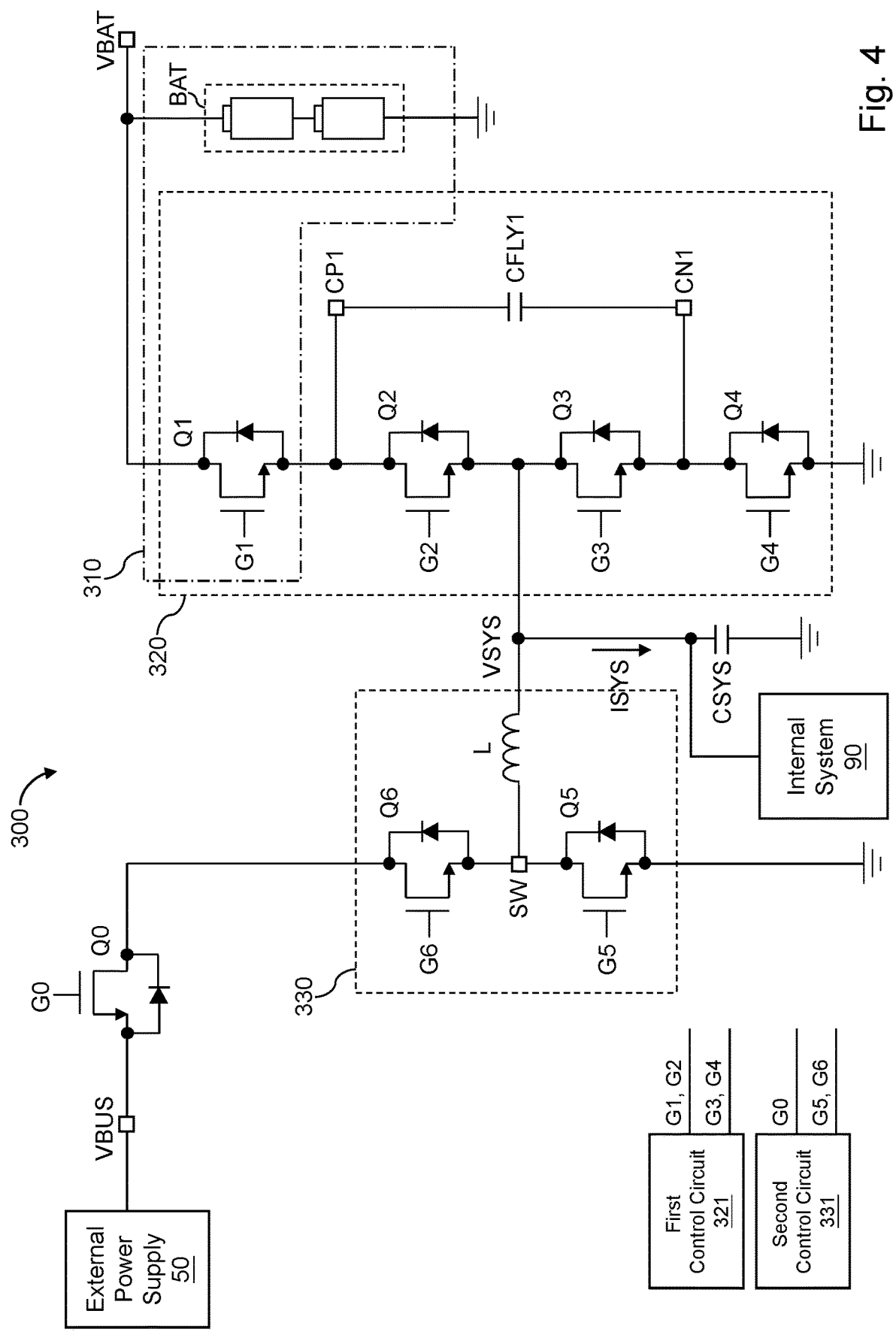
FIG. 4 shows a circuit configuration of a multi-mode power system according to an embodiment of the present invention.

Please refer to FIG. 4, which shows a circuit configuration of a multi-mode power system 300 according to an embodiment of the present invention. As shown in FIG. 4, the multi-mode power system 300 comprises: a battery module 310, a first conversion circuit 320 and a second conversion circuit 330. The battery module 310 includes a battery path switch Q1 and a battery group BAT which are connected in series to each other. The battery group BAT includes at least one battery. The power of the battery group BAT (referred to as "battery power" hereinafter) includes a voltage of the battery group BAT (referred to as "battery voltage VBAT" hereinafter). In one embodiment, the battery group BAT includes at least two battery cells, wherein the battery voltage VBAT is greater than or equal to the system voltage VSYS.

In one embodiment, the first conversion circuit 320 includes: a first switch Q1 (i.e., battery path switch Q1), a second switch Q2, a third switch Q3, a fourth switch Q4, a first capacitor CFLY1 and a first control circuit 321, wherein the first switch Q1 and the battery path switch Q1 are one same switch. That is, the first conversion circuit 320 and the battery module 310 share the battery path switch Q1 (i.e., the first switch Q1). For simplicity, the battery path switch Q1 will be referred to as the first switch Q1 hereinafter in this description. The first switch Q1 has a first control end, a first opposite-phase output end and a first in-phase output end, wherein the first opposite-phase output end is coupled to the battery group BAT. The second switch Q2 has a second control end, a second opposite-phase output end and a second in-phase output end, wherein the second opposite-phase output end, the first in-phase output end and a first end of the capacitor CFLY1 are coupled to a node CP1. The third switch has a third control end, a third opposite-phase output end and a third in-phase output end, wherein the third opposite-phase, the second in-phase output end and the internal system 90 are commonly coupled to the system power (corresponding to the system voltage VSYS). The fourth switch has a fourth control end, a fourth opposite-phase output end and a fourth in-phase output end, wherein the fourth opposite-phase output end, the third in-phase output end and a second end of the capacitor CFLY1 are coupled to a node CN1. The fourth in-phase output end is coupled to ground. The first control circuit 321 is coupled to the first control end, the second control end, the third control end and the fourth control end, and the first control circuit 321 is configured to operably generate a first control signal G1, a second control signal G2, a third control signal G3, a fourth control signal G4, so as to control the first switch Q1, the second switch Q2, the third switch Q3 and the fourth switch Q4, respectively.

In one embodiment, the second conversion circuit 330 includes: a fifth switch Q5, a sixth switch Q6, an inductor L and a second control circuit 331. The fifth switch Q5 has a fifth control end, a fifth opposite-phase output end and a fifth in-phase output end. The sixth switch Q6 has a sixth control end, a sixth opposite-phase output end and a sixth in-phase output end. The fifth in-phase output end is coupled to ground. The fifth opposite-phase output end, the sixth in-phase output end and a first end of the inductor L are coupled to a switching node SW. The sixth opposite-phase output end is coupled to the external power supply 50. A second end of the inductor L and a system capacitor CSYS are coupled to the system power (corresponding to the system voltage VSYS). The second control circuit 331 is coupled to the fifth control end and the sixth control end, and the second control circuit 331 is configured to operably generate a fifth control signal G5 and a sixth control signal G6, so as to control the fifth switch Q5 and the sixth switch Q6, respectively. In one embodiment, the multi-mode power system 300 further comprises: an external path switch Q0, which is configured to operably control a path between the external power supply 50 and the sixth switch Q6 to determine whether it is conductive. The external path switch Q0 is controlled by a path control signal G0 generated by the second control circuit 331. In situations other than the second OFF mode, the external path switch Q0 is kept ON.

In one embodiment, the battery voltage VBAT is greater than or equal to the system voltage VSYS. A voltage of external power supply (referred to as "external voltage VBUS" hereinafter) is greater than or equal to the system voltage VSYS. The external voltage VBUS is greater than or equal to or smaller than the battery voltage VBAT. Because the system voltage VSYS is relatively lower, the internal system 90 can employ low voltage devices, which costs lower. In one embodiment, the withstand voltages ("withstand voltage" means a voltage that a component is able to withstand) of the low voltage devices adopted by the internal system 90 are lower than the battery voltage VBAT. In one embodiment, the withstand voltages of the low voltage devices adopted by the internal system 90 are lower than the external voltage VBUS.

In one embodiment, when the first conversion circuit 320 operates in the first bypass mode, the first switch Q1 and the second switch Q2 are always ON, whereas the third switch Q3 and the fourth switch Q4 are always OFF, whereby a path between the battery group BAT and the system power is also always ON, so that the battery group BAT directly supplies power to the internal system 90 or so that the system power directly charges the battery group BAT. Under such situation, the battery voltage VBAT will be equal to the system voltage VSYS.

In one embodiment, when the first conversion circuit 320 operates in the first incoming mode, the first conversion circuit 320 operates as a charge pump, which is configured to operably pump the system voltage VSYS to generate the battery voltage VBAT, to charge the battery group BAT. Under such circumstance, the battery voltage VBAT is higher than the system voltage VSYS. In this embodiment, the battery voltage VBAT is for example 2-fold of the system voltage VSYS, wherein the first switch Q1, the second switch Q2, the third switch Q3 and the fourth switch Q4 are periodically switched between an ON state and an Off state. When the first switch Q1 and the third switch Q3 are ON, the second switch Q2 and the fourth switch Q4 are OFF; when the first switch Q1 and the third switch Q3 are OFF, the second switch Q2 and the fourth switch Q4 are ON. To elaborate in more detail, in this embodiment, the first switch Q1 and the second switch Q2 are configured to operably and periodically switch a first end of the capacitor CFLY1 between the battery voltage VBAT and the system power (corresponding to the system voltage VSYS), whereas, the third switch Q3 and the fourth switch Q4 are configured to operably and periodically switch a second end of the capacitor CFLY1 between the system power (corresponding to the system voltage VSYS) and ground.

In one embodiment, when the first conversion circuit 320 operates in the first outgoing mode, the first conversion circuit 320 is a capacitive voltage-divider circuit, which is configured to operably divide the battery voltage VBAT by capacitive switching conversion operation, so as to generate the system voltage VSYS for supplying power to the internal system 90, or to further convert the system power to the external power supply 50 for supplying power to an external load. Under such situation, the battery voltage VBAT is greater than the system voltage VSYS (e.g., the battery voltage VBAT is 2-fold of the system voltage VSYS). In one embodiment, the first switch Q1, the second switch Q2, the third switch Q3 and the fourth switch Q4 switch the second end of the capacitor CFLY1 in the same way as the aforementioned charge pump, so the details thereof are not redundantly repeated here.

In one embodiment, when the second conversion circuit 330 operates in the second bypass mode, the sixth switch Q6 is always ON, whereas the fifth switch Q5 is always OFF, whereby the system power and the external power supply 50 are always in conduction with each other via the inductor L, so that the external power supply 50 can directly charge the internal system 90, or the system power can directly charge the external power supply 50. Under such situation, the external voltage VBUS will be equal to the system voltage VSYS.

In one embodiment, when the second conversion circuit 330 operates in the second incoming mode, the second conversion circuit 330 is a buck converter. In one embodiment, the second conversion circuit 330 is a 2-level buck converter, as shown by the second conversion circuit 330 in FIG. 4. In this embodiment, the fifth switch Q5 and the sixth switch Q6 are periodically switched between an ON state and an OFF state. When the fifth switch Q5 is ON, the sixth switch is OFF; when the fifth switch Q5 is OFF, the sixth switch Q6 is ON. To elaborate in more detail, the fifth switch Q5 and the sixth switch Q6 are configured to operably and periodically switch the first end (i.e., the switching node SW) of the inductor L between the external power supply 50 and ground, so as to convert the external power supply 50 to the system power (corresponding to the system voltage VSYS) at the second end of the inductor L, for charging the internal system 90. The external power supply 50 can be further converted to the battery power through the above-mentioned first conversion circuit 320, for charging the battery group BAT. Under such circumstance, the external voltage VBUS is greater than or equal to the system voltage VSYS. In one embodiment, a ratio of the system voltage VSYS to the external voltage VBUS is proportional to a duty ratio of the sixth switch Q6.

In one embodiment, when the second conversion circuit 330 operates in the second outgoing mode, the second conversion circuit 330 is a boost converter. In one embodiment, the second conversion circuit 330 is a 2-level boost converter, as shown by the second conversion circuit 330 in FIG. 4. To elaborate in more detail, the fifth switch Q5 and the sixth switch Q6 are configured to operably and periodically switch the first end (i.e., the switching node SW) of the inductor L between the external power supply 50 and ground, so as to convert the system power (corresponding to the system voltage VSYS) to generate the external power supply 50 at the sixth opposite-phase output end of the sixth switch Q6, for supplying power to the external load. In one embodiment, a ratio of the external voltage VBUS to the system voltage VSYS is proportional to a duty ratio of the fifth switch Q5.

In one embodiment, when the first conversion circuit 320 operates in the first OFF mode, the first switch Q1 and the second switch Q2 are always OFF. In one embodiment, when the first conversion circuit 320 operates in the first OFF mode, at least one of the third switch Q3 and the fourth switch Q4 is also always OFF. Under such situation, a path between the battery group BAT and the internal system 90 (i.e., a path between the battery power and the system power) is in an open-circuit state. In one embodiment, when the second conversion circuit 330 operates in the second OFF mode, the sixth switch Q6 is always OFF. Under such situation, a path between the external power supply 50 and the internal system 90 is in an open-circuit state. In one embodiment, when the second conversion circuit 330 operates in the second OFF mode, the fifth switch Q5 and the external path switch Q0 are also always OFF.

In one embodiment, when the first conversion circuit 320 operates in the first incoming mode or the first bypass mode and when the second conversion circuit 330 operates in the second incoming mode or the second bypass mode, the multi-mode power system 300 will operate in a plug-in and charging mode. In the plug-in and charging mode, the external power supply 50 will supply power to the internal system 90 and the battery group BAT at the same time. As an example, in a situation where the multi-mode power system 300 is applied to a notebook computer, when the notebook computer is in the plug-in and charging mode, it indicates that the notebook computer includes a battery embedded inside and the notebook computer receives power from a plugged-in power supply. Under such circumstance, the power supplied to the notebook computer solely comes from the external power supply 50.

In one embodiment, when the first conversion circuit 320 operates in the first outgoing mode or the first bypass mode and when the second conversion circuit 330 operates in the second incoming mode or the second bypass mode, the multi-mode power system 300 will operate in an overclocking mode. In the overclocking mode, the external power supply 50 and the battery group BAT will supply power to the internal system 90 at the same time, so that the internal system 90 can obtain higher and stable voltage level, for better performance. As an example, in a situation where the multi-mode power system 300 is applied to a notebook computer, when the notebook computer is in the overclocking mode, it indicates that the notebook computer includes a battery embedded inside and the notebook computer receives power from a plugged-in power supply. Under such circumstance, the notebook computer receives power from both the external power supply 50 and the battery group BAT.

In one embodiment, when the first conversion circuit 320 operates in the first outgoing mode or the first bypass mode and when the second conversion circuit 330 operates in the second OFF mode, the multi-mode power system 300 will operate in a mobile operation mode. In the mobile operation mode, the battery group BAT will supply power to the internal system 90. As an example, in a situation where the multi-mode power system 300 is applied to a notebook computer, when the notebook computer is in the mobile operation mode, it indicates that the notebook computer includes a battery embedded inside and the notebook computer does not receive power from a plugged-in power supply. Under such circumstance, the notebook computer receives power solely from the battery group BAT.

In one embodiment, when the first conversion circuit 320 operates in the first outgoing mode or the first bypass mode and when the second conversion circuit 330 operates in the second outgoing mode or the second bypass mode, the multi-mode power system 300 will operate in a mobile power supply mode. In the mobile power supply mode, the battery group BAT will to the internal system 90 and the external power supply 50 at the same time supply power. As an example, in a situation where the multi-mode power system 300 is applied to a notebook computer, when the notebook computer is in the mobile power supply mode and a charge mode, it indicates that the notebook computer includes a battery embedded inside and the notebook computer does not receive power from a plugged-in power supply. Under such circumstance, the notebook computer receives power solely from the battery group BAT. Besides, the notebook computer can supply power to an external device (e.g., USB PD charging system or USB OTG system).

In one embodiment, the first conversion circuit 320 and the second conversion circuit 330 can operate synchronously. To elaborate in more detail, when the first conversion circuit 320 and the second conversion circuit 330 operate synchronously, the switches in the first conversion circuit 320 and the switches in the second conversion circuit 330 are switched with a same frequency. In one embodiment, duty ratios of the switches in the first conversion circuit 320 are correlated with duty ratios of the switches in the second conversion circuit 330. For example, the duty ratios of the switches in the first conversion circuit 320 can be for example but not limited to the same as the duty ratios of the switches in the second conversion circuit 330. Or, the duty ratios of the switches in the first conversion circuit 320 and the duty ratios of the switches in the second conversion circuit 330 can be complement numbers of one to each other (i.e., the duty ratio of a switch in the first conversion circuit 320 is for example x and the duty ratio of a switch in the second conversion circuit 330 is for example (1-x)).

How the first conversion circuit 320 and the second conversion circuit 330 operate will be explained in more detail with reference to the embodiments below.

Figure 5A:
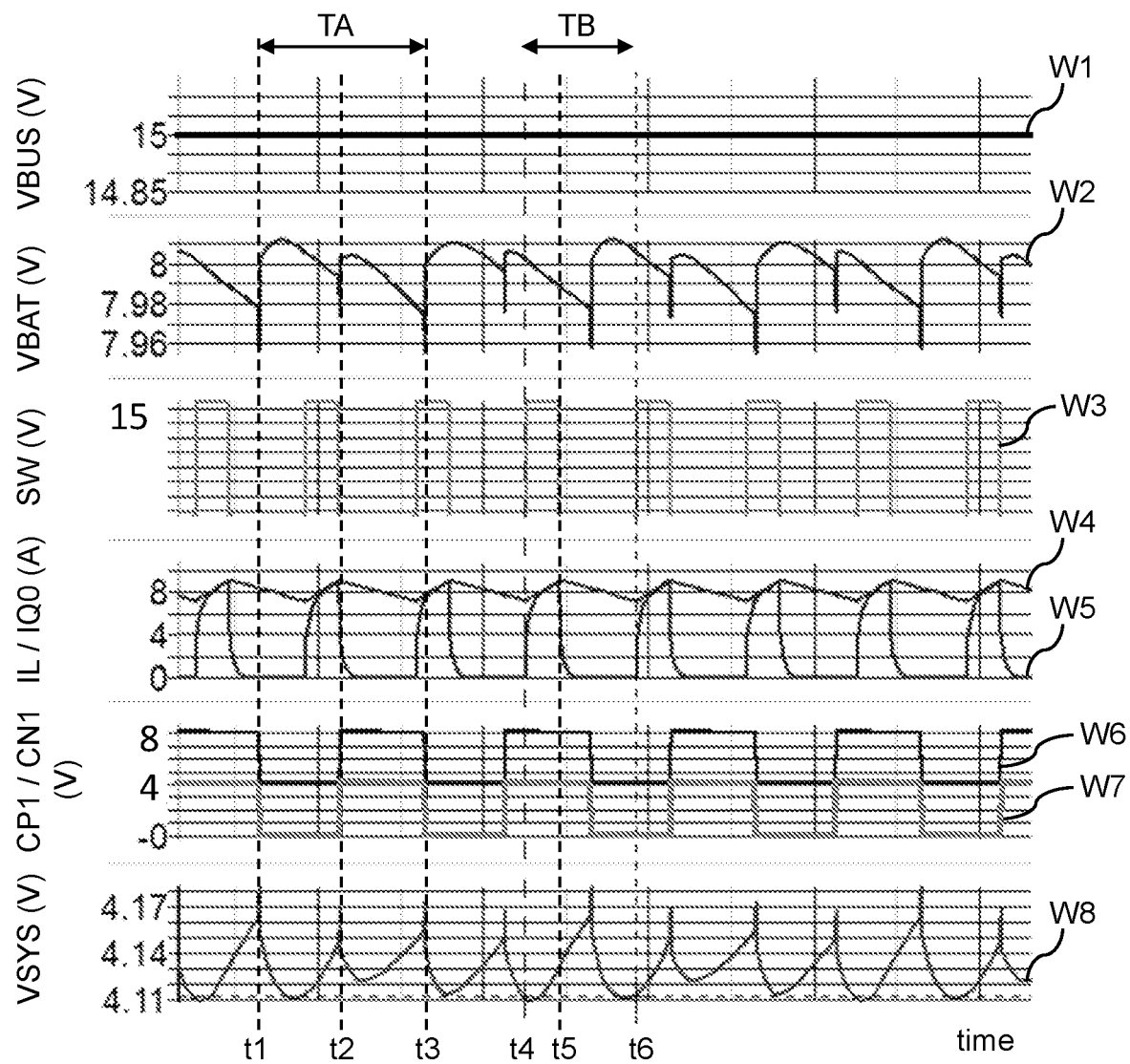
FIG. 5A illustrates signal waveforms depicting the operation of a first conversion circuit and a second conversion circuit according to an embodiment of the present invention.

Please refer to FIG. 5A, which illustrates signal waveforms depicting the operation of the first conversion circuit 320 and the second conversion circuit 330 according to an embodiment of the present invention. In this embodiment, the first conversion circuit 320 operates in the first incoming mode and the second conversion circuit 330 operates in the second incoming mode (i.e., the plug-in and charging mode). In the diagram, the waveform W1 indicates the external voltage VBUS; the waveform W2 indicates the battery group BAT; the waveform W3 indicates the switching node SW; the waveform W4 indicates a current flowing through the inductor L; the waveform W5 indicates a current flowing through the external path switch Q0; the waveform W6 indicates a voltage at the node CP1; the waveform W7 (illustrated as grey line) indicates a voltage at the node CP1; the waveform W8 indicates the system voltage VSYS.

As shown in FIG. 5A, within a period (e.g., as shown by the period ranging from the timing point t1 to the timing point t2 in FIG. 5A), the first control circuit 321 controls the second switch Q2 and the fourth switch Q4 to be ON and controls the first switch Q1 and the third switch Q3 to be OFF, so that the system power (corresponding to the system voltage VSYS) charges the first capacitor CFLY1. Within another period (e.g., as shown by the period ranging from the timing point t2 to the timing point t3 in FIG. 5A), the first control circuit 321 controls the second switch Q2 and the fourth switch Q4 to be OFF and controls the first switch Q1 and the third switch Q3 to be ON, so that the first capacitor CFLY1 is superimposed on the system voltage VSYS, and the first capacitor discharges. The above-mentioned switching operations are performed by a switching period TA, so as to generate a battery voltage VBAT which is 2-fold of the system voltage VSYS, to charge the battery group BAT. On the other hand, within a period (e.g., as shown by the period ranging from the timing point t4 to the timing point t5 in FIG. 5A), the second control circuit 331 controls the sixth switch Q6 to be ON and synchronously controls the fifth switch Q5 to be OFF. Within another period (e.g., as shown by the period ranging from the timing point t5 to the timing point t6 in FIG. 5A), the second control circuit 331 controls the sixth switch Q6 to be OFF and synchronously controls the fifth switch Q5 to be ON. The above-mentioned switching operations are performed by a switching period TB, so as to periodically switch one end of the inductor L between the external power supply 50 (i.e., the external voltage VBUS) and ground, thus converting the external power supply 50 (i.e., the external voltage VBUS) to the system power (i.e., the system voltage VSYS), so that the system power not only supplies power to the internal system 90, but also charges the battery group BAT. The first conversion circuit 320 and the second conversion circuit 330 respectively execute the above-mentioned periodical switching to accomplish the above-mentioned plug-in and charging mode, wherein the external power supply 50 is converted to the system power and the battery power, so as to supply power to the internal system 90 via the system power and charge the battery group BAT via the battery power. It is worthwhile noting that, in this embodiment, the first conversion circuit 320 and the second conversion circuit 330 are switched according to the switching period TA and the switching period TB, respectively. That is, in this embodiment, the switching of the first conversion circuit 320 and the switching of the second conversion circuit 330 are not synchronous to each other. Besides, in this embodiment, the duty ratio of the switches in the first conversion circuit 320 is 50%, whereas, the duty ratio of the switches in the second conversion circuit 330 is correlated with a ratio of the external voltage VBUS to the system voltage VSYS.

Figure 5B:
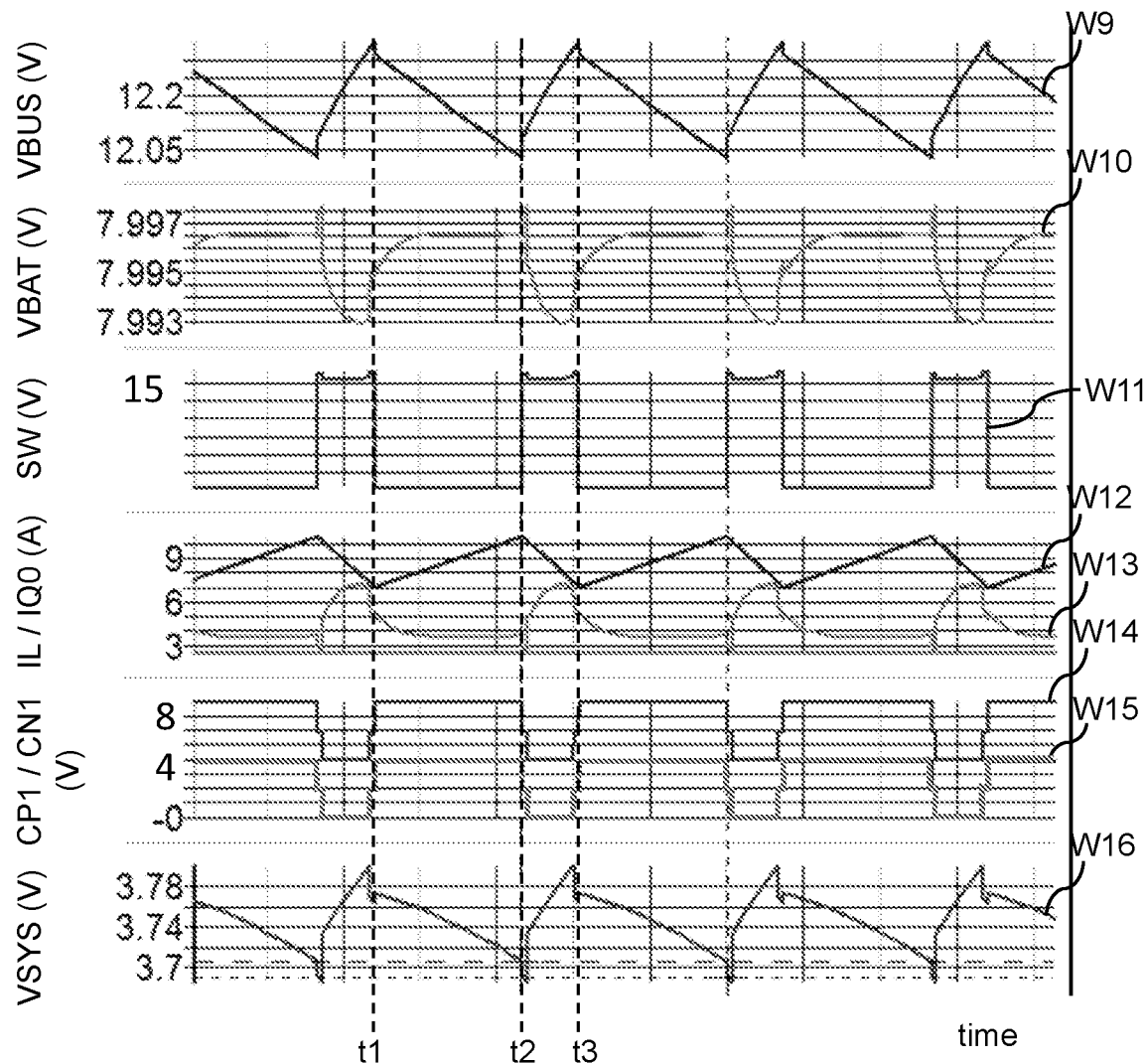
FIG. 5B illustrates signal waveforms depicting a situation where a first conversion circuit and a second conversion circuit operate in synchronous operation according to an embodiment of the present invention.

Please refer to FIG. 5B, which illustrates signal waveforms depicting a situation where the first conversion circuit 320 and the second conversion circuit 330 operate in synchronous operation according to an embodiment of the present invention. In this embodiment, the first conversion circuit 320 operates in the first outgoing mode and the second conversion circuit 330 operates in the second outgoing mode (i.e., a mobile power supply mode). In the diagram, the waveform W9 indicates the external voltage VBUS; the waveform W10 indicates the battery group BAT; the waveform W11 indicates the switching node SW; the waveform W12 indicates a current flowing through the inductor L; the waveform W13 indicates a current flowing through the external path switch Q0; the waveform W14 indicates a voltage at the node CP1; the waveform W15 (illustrated as grey line) indicates a voltage at the node CP1; the waveform W16 indicates the system voltage VSYS.

As shown in FIG. 5B, when the first conversion circuit 320 and the second conversion circuit 330 begin to operate in synchronous operation, within a period (e.g., as shown by the period ranging from the timing point t1 to the timing point t2 in FIG. 5B), the first control circuit 321 controls the first switch Q1 and the third switch Q3 to be ON and controls the second switch Q2 and the fourth switch Q4 to be OFF, and, the second control circuit 331 synchronously controls the sixth switch Q6 to be OFF and synchronously controls the fifth switch Q5 to be ON. Under such situation, the inductor L and the first capacitor CFLY1 are connected in series to the battery group BAT, so that the battery group BAT charges the inductor L and the first capacitor CFLY1 (i.e., as shown by the timing point t3 in FIG. 5B). Subsequently, within another period (e.g., as shown by the period ranging from the timing point t2 to the timing point t3 in FIG. 5B), the first control circuit 321 controls the first switch Q1 and the third switch Q3 to be OFF and controls the second switch Q2 and the fourth switch Q4 to be ON, and, the second control circuit 331 synchronously controls the sixth switch Q6 to be ON and synchronously controls the fifth switch Q5 to be OFF. Under such situation, the inductor L and the first capacitor CFLY1 are connected in series to the external power supply 50, so that the inductor L and the first capacitor CFLY1 discharge. The first conversion circuit 320 and the second conversion circuit 330 execute the above-mentioned periodical switching to accomplish the above-mentioned mobile power supply mode, and convert the battery power to the system power and the external power supply 50, so as to supply power to the internal system 90 via the system power and supply power to the external load via the external power supply 50.

It is worthwhile noting that, in another embodiment, in the mobile power supply mode, the first conversion circuit 320 and the second conversion circuit 330 can operate in non-synchronous operation according to different switching periods. In another embodiment, in the mobile power supply mode, the first conversion circuit 320 and the second conversion circuit 330 can operate in partial synchronous operation according to the same switching period but different duty ratios. In another embodiment, in the plug-in and charging mode, the first conversion circuit 320 and the second conversion circuit 330 can operate in synchronous operation according to switching periods which are synchronous to each other and/or different duty ratios which are synchronous to each other.

Figure 6:
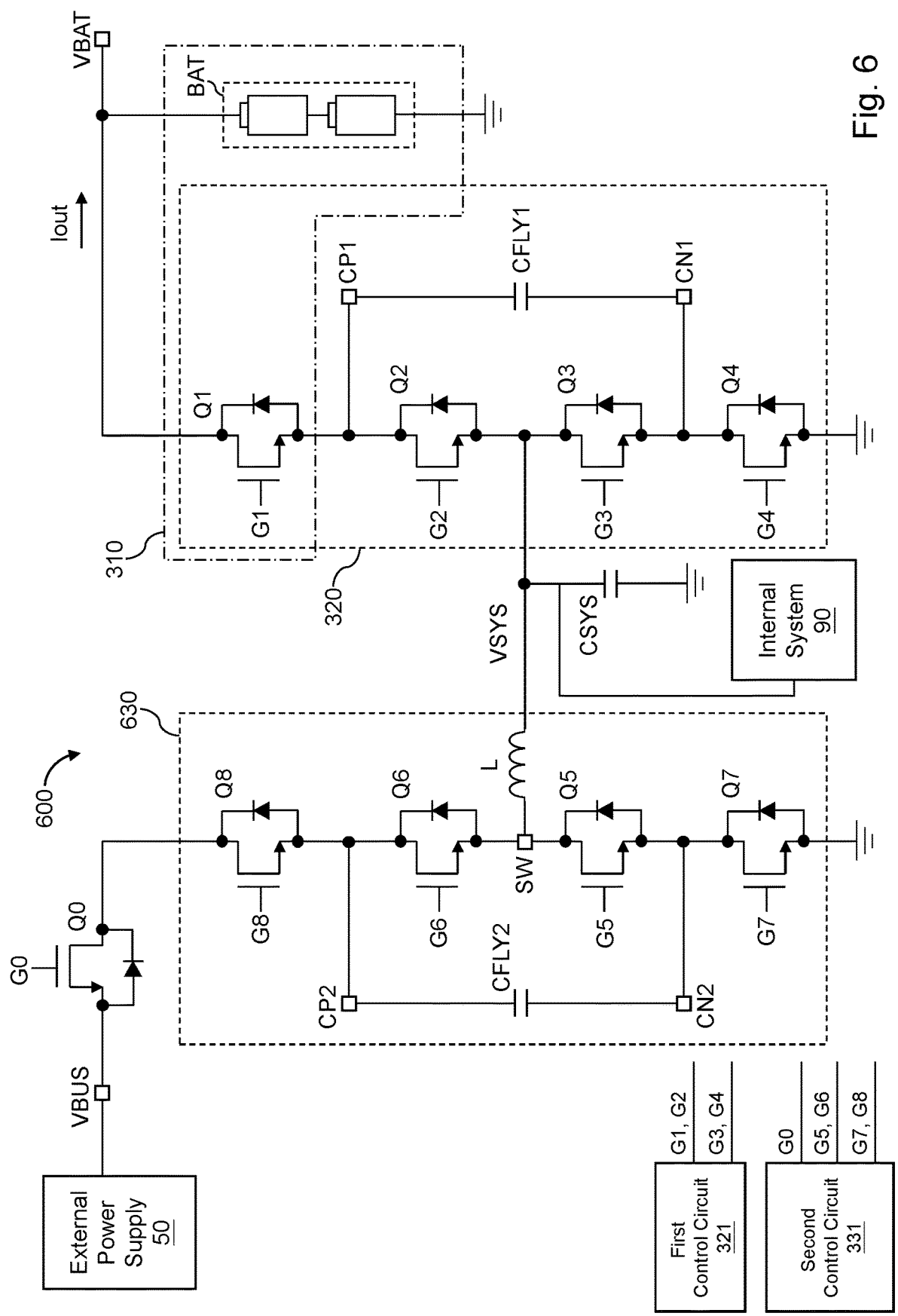
FIG. 6 shows a circuit configuration of a multi-mode power system according to another embodiment of the present invention.

In one embodiment, the second conversion circuit 330 is a 3-level buck converter, wherein the configuration of the 3-level buck converter can further reduce power loss during power conversion. As compared to the multi-mode power system 300, the 3-level buck converter can further enhance power conversion efficiency. Please refer to FIG. 6, which shows a circuit configuration of a multi-mode power system 600 according to another embodiment of the present invention. In the embodiment of FIG. 6, the second conversion circuit 630 is similar to the second conversion circuit 330 of FIG. 4, but in this embodiment, the second conversion circuit 630 further includes: a seventh switch Q7, an eighth switch Q8 and a second capacitor CFLY2. The seventh switch Q7 has a seventh control end, a seventh opposite-phase output end and a seventh in-phase output end. The eighth switch Q8 has an eighth control end, an eighth opposite-phase output end and an eighth in-phase output end. The seventh opposite-phase output end, the fifth in-phase output end and the second end of the second capacitor CFLY2 are coupled to a node CN2. The seventh in-phase output end is coupled to ground. The eighth opposite-phase output end is coupled to the external power supply 50 via an external path switch Q0. The eighth in-phase output end, the sixth opposite-phase output end the first end of the second capacitor CFLY2 are coupled to a node CP2. The second control circuit 331 is further coupled to the seventh control end and the eighth control end, and the second control circuit 331 is further configured to operably generate a seventh control signal G7, an eighth control signal G8, so as to control the seventh switch Q7 and the eighth switch Q8, respectively. In one embodiment, the external path switch Q0 is configured to operably control a path between the external power supply 50 and the eighth switch Q8. The external path switch Q0 is controlled by a path control signal G0 generated by the second control circuit 331.

In one embodiment, when the second conversion circuit 630 of FIG. 6 operates in the second bypass mode, the sixth switch Q6 and the eighth switch Q8 are always ON, whereas, the fifth switch Q5 and the seventh switch Q7 are always OFF, so that a path between the internal system 90 and the external power supply 50 is always ON. As a result, the external power supply 50 will directly supply power to the internal system 90 or the system power will directly supply power to the external power supply 50. Under such situation, the external voltage VBUS will be equal to the system voltage VSYS.

In one embodiment, when the second conversion circuit 330 operates in the second outgoing mode or in the second incoming mode, the fifth switch Q5, the sixth switch Q6, the seventh switch Q7 and the eighth switch Q8 are periodically switched between an ON state and an Off state, so that a voltage at the switching node SW is switched among the external voltage VBUS, ½-fold of the external voltage VBUS and ground, to thereby achieve 3-level inductive switching power conversion. More specifically, in one embodiment, when the fifth switch Q5 and the eighth switch Q8 are ON, the sixth switch Q6 and the seventh switch Q7 are OFF. When the fifth switch Q5 and the eighth switch Q8 are OFF, the sixth switch Q6 and the seventh switch Q7 are ON.

In one embodiment, when the second conversion circuit 630 of FIG. 6 operates in the second OFF mode, the fifth switch Q5, the sixth switch Q6, the seventh switch Q7 and the eighth switch Q8 are always OFF. Under such situation, a path between the external power supply 50 and the internal system 90 is in an open-circuit state.

In one embodiment, the first conversion circuit 320 and the second conversion circuit 630 of FIG. 6 can operate in synchronous operation. For example, when the first conversion circuit 320 operates in the first incoming mode and the second conversion circuit 630 synchronously operates in the second incoming mode, the first switch Q1, the second switch Q2, the third switch Q3, the fourth switch Q4, the fifth switch Q5, the sixth switch Q6, the seventh switch Q7 and the eighth switch Q8 are periodically switched between an ON state and an OFF state. When the first switch Q1, the third switch Q3, the fifth switch Q5 and the eighth switch Q8 are ON, the second switch Q2, the fourth switch Q4, the sixth switch Q6 and the seventh switch Q7 are OFF. When the first switch Q1, the third switch Q3, the fifth switch Q5 and the eighth switch Q8 are OFF, the second switch Q2, the fourth switch Q4, the sixth switch Q6 and the seventh switch Q7 are ON.

In one embodiment, the switches in the multi-mode power system 300 and the switches in the multi-mode power system 600 are metal oxide semiconductor field effect transistors (MOSFET), wherein the control end of each switch is a gate; the opposite-phase output end of each switch is a drain; the in-phase output end of each switch is a source. Taking the first switch Q1 as an example, when the first switch Q1 is a MOSFET, the first control end of the first switch Q1 is a gate, the first opposite-phase output end of the first switch Q1 is a drain, and the first in-phase output end of the first switch Q1 is a source.

In one embodiment, the first conversion circuit 320 is a Dickson converter 700, wherein the Dickson converter 700 can operate in a 2-fold conversion mode, a 3-fold conversion mode or a 4-fold conversion mode. That is, the Dickson converter 700 can control the battery voltage VBAT to be 2-fold, 3-fold or 4-fold of the system voltage VSYS, so that the battery module 310 can adopt a battery group BAT having different voltage levels, whereby the multi-mode power system 300 has a broad application range able to be applied to different systems. Please refer to FIG. 7, which shows a schematic diagram of a Dickson converter 700 according to an embodiment of the present invention. Because Dickson converter 700 is well known to those skilled in the art, so the details thereof are not redundantly explained here, and the following description will focus on how the Dickson converter 700 of this embodiment operates in different conversion modes.

Figure 7:
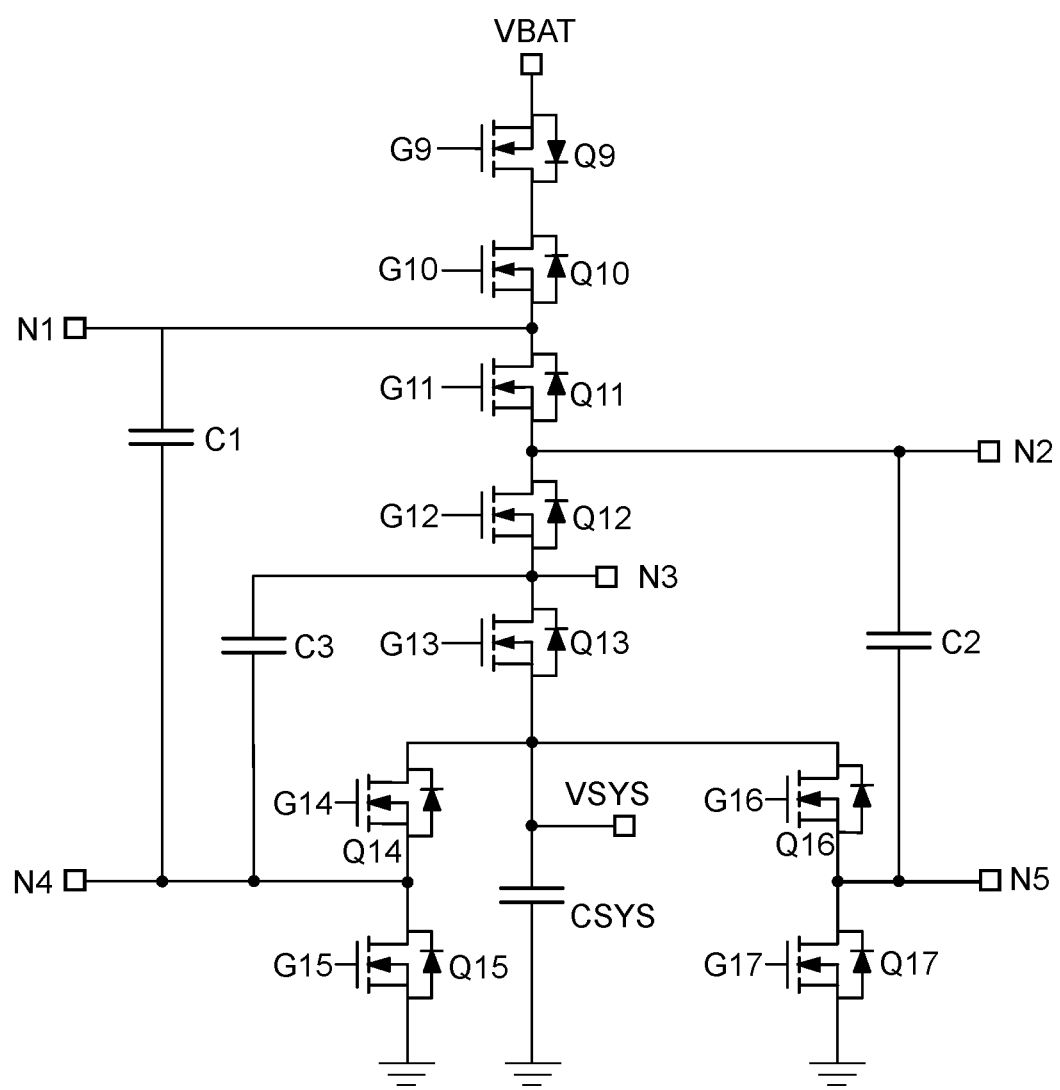
FIG. 7 shows a schematic diagram of a Dickson converter according to an embodiment of the present invention.

As shown in FIG. 7, the Dickson converter 700 includes: switches Q9-Q17 and capacitors C1-C3. In one embodiment, when the Dickson converter 700 operates in a 2-fold conversion mode, the switch Q10 and switches Q13-Q17 are periodically switched between an ON state and an OFF state. When the switch Q10, the switch Q14 and the switch Q16 are ON, the switch Q13, the switch Q15 and the switch Q17 are OFF. When the switch Q10, the switch Q14 and the switch Q16 are OFF, the switch Q13, the switch Q15 and the switch Q17 are ON.

In one embodiment, when the Dickson converter 700 operates in a 3-fold conversion mode, the switches Q10-Q17 are periodically switched between an ON state and an OFF state. When the switch Q10, the switch Q11, the switch Q13, the switch Q15 and the switch Q16 are ON, the switch Q12, the switch Q14 and the switch Q17 are OFF. When the switch Q10, the switch Q11, the switch Q13, the switch Q15 and the switch Q16 are OFF, the switch Q12, the switch Q14 and the switch Q17 are ON.

In one embodiment, when the Dickson converter 700 operates in a 4-fold conversion mode, the switches Q10-Q17 are periodically switched between an ON state and an OFF state. When the switch Q10, the switch Q12, the switch Q14 and the switch Q17 are ON, the switch Q11, the switch Q13, the switch Q15 and the switch Q16 are OFF. When the switch Q10, the switch Q12, the switch Q14 and the switch Q17 are OFF, the switch Q11, the switch Q13, the switch Q15 and the switch Q16 are ON.

Figure 8A:
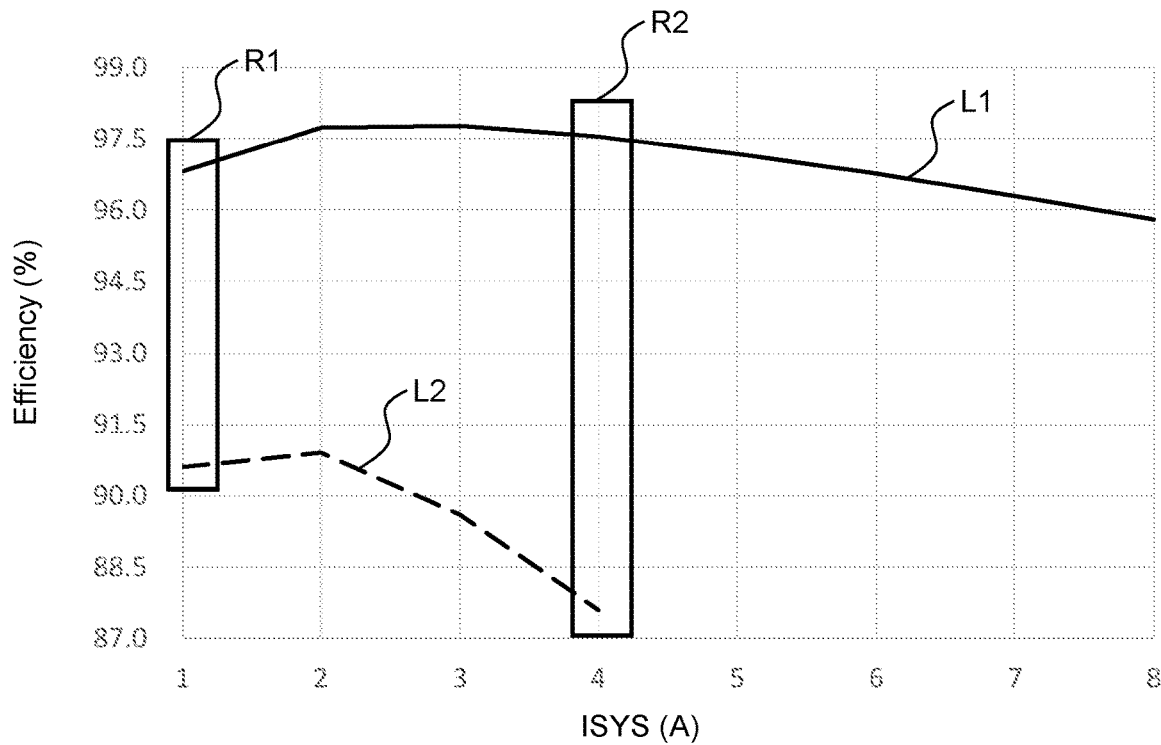
FIG. 8A illustrates a curve depicting power conversion efficiency of a multi-mode power system according to an embodiment of the present invention.
Figure 8B:
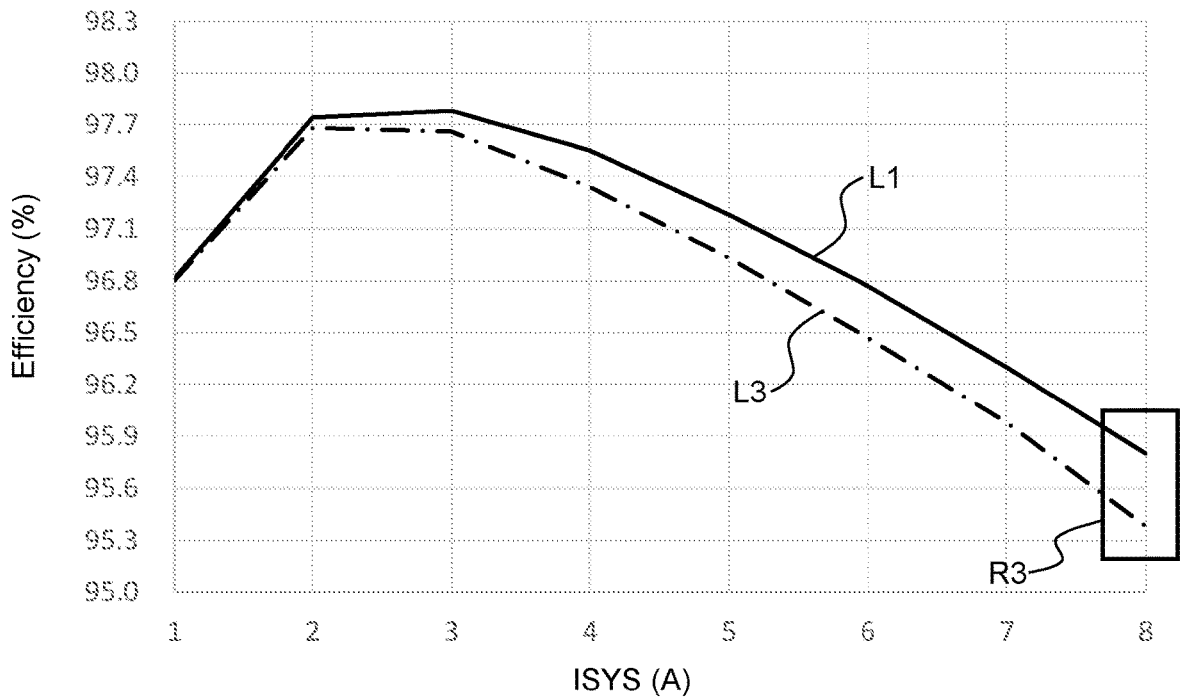
FIG. 8B illustrates a curve depicting power conversion efficiency of a multi-mode power system according to an embodiment of the present invention.

Please refer to FIG. 8A in conjugation with FIG. 8B. FIGS. 8A and 8B illustrates curves depicting power conversion efficiency of a multi-mode power system 300 according to an embodiment of the present invention. The solid line L1 corresponds to a situation where the battery module 310 and the first conversion circuit 320 in the multi-mode power system 300 of FIG. 4 operate in the first outgoing mode. That is, the solid line L1 indicates an efficiency curve of converting the battery power of the battery group BAT to the system power (which includes a system voltage VSYS and a system current ISYS), wherein the system power is supplied to the internal system 90. The dashed line L2 corresponds to an efficiency curve of the battery module 120 and the buck converter 130 in the conventional power system 100 of FIG. 1 when converting the battery power of the battery group BAT to the system power, wherein the system power is supplied to the internal system 90.

Figure 1:
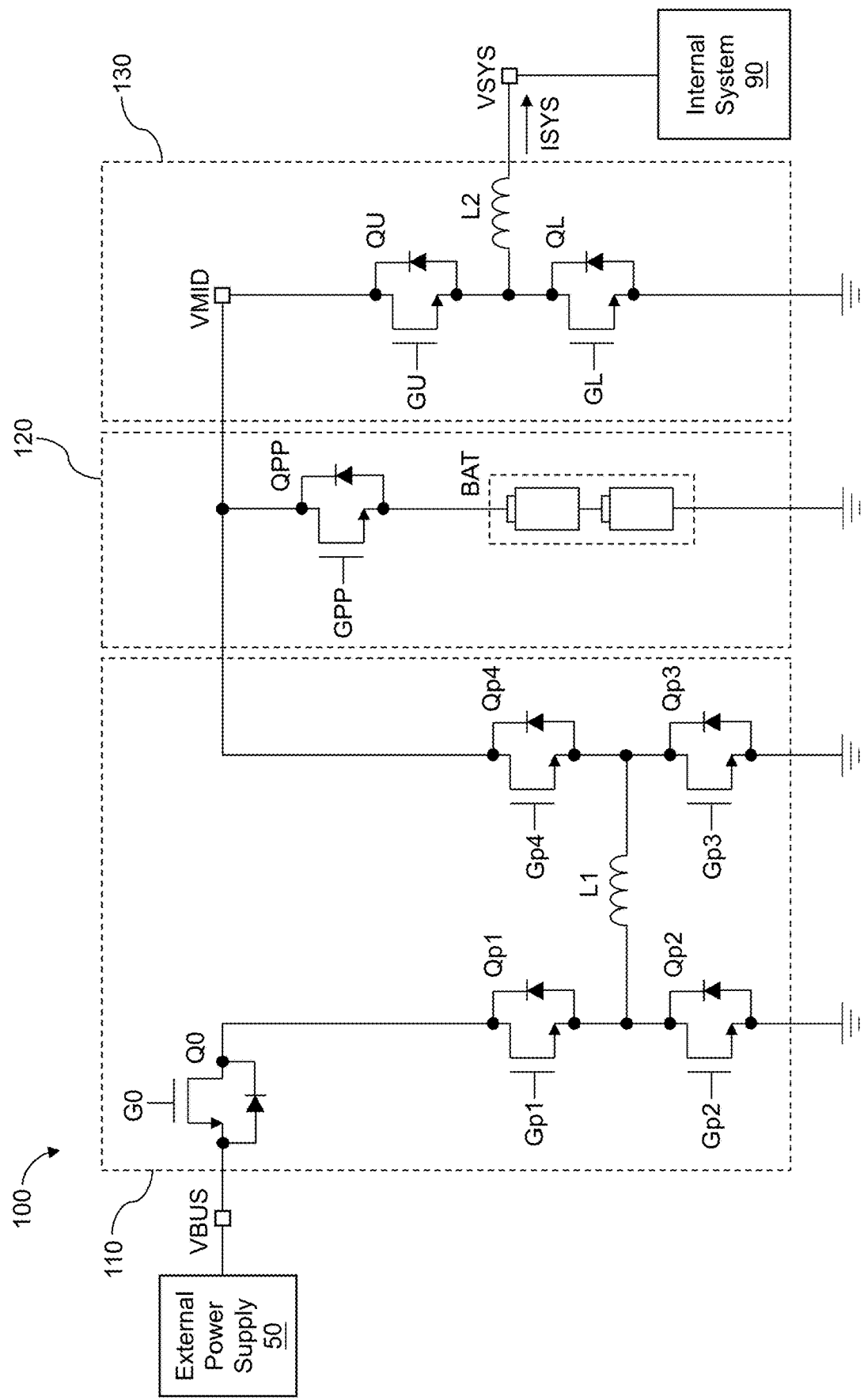
FIG. 1 shows a schematic diagram of a conventional power system.
Figure 2:
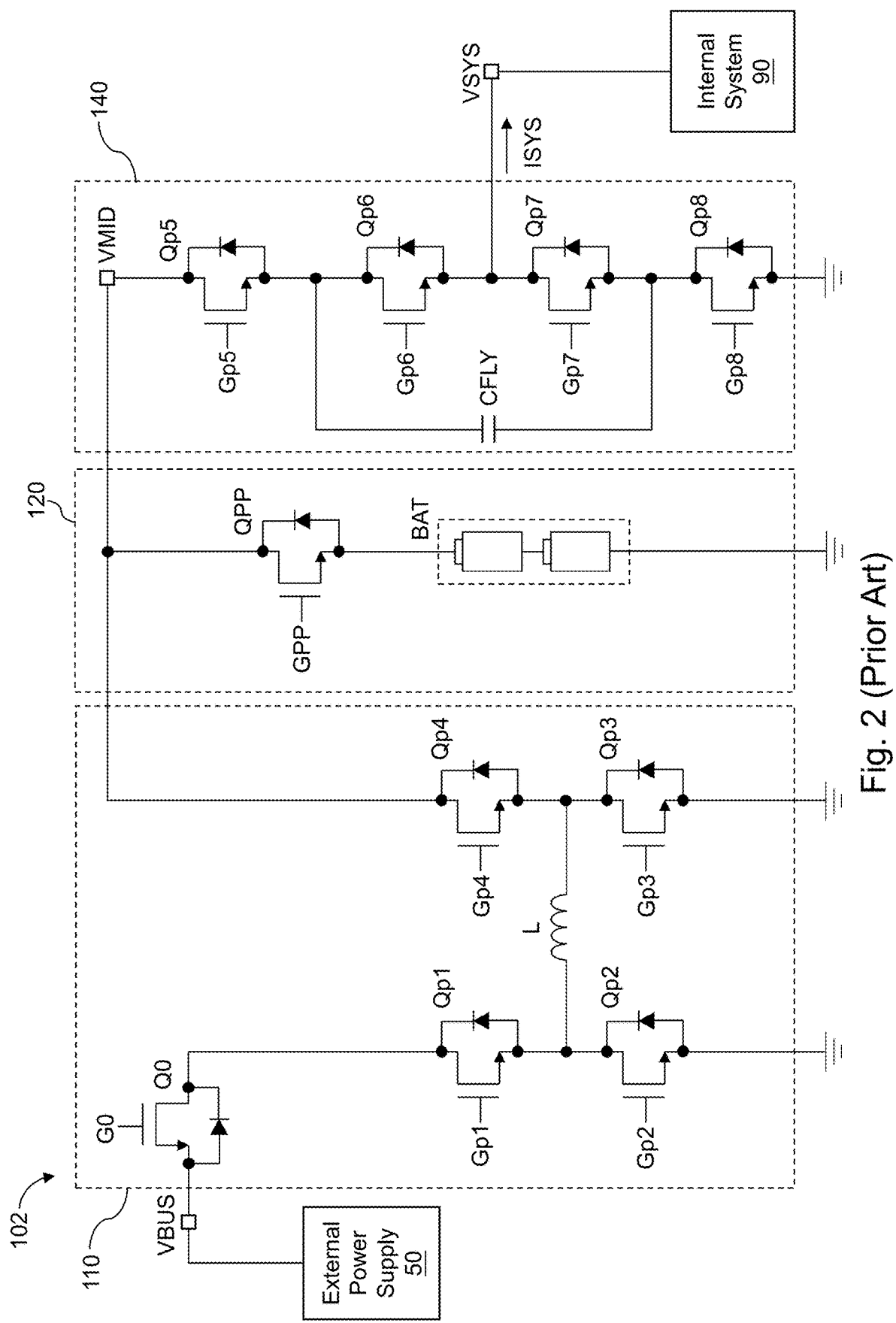
FIG. 2 shows a schematic diagram of another conventional power system.

The one dot-and-dash line L3 corresponds to an efficiency curve of the battery module 120 and the divided-by-2 converter 140 in the conventional power system 102 of FIG. 2 when converting the battery power of the battery group BAT to the system power, wherein the system power is supplied to the internal system 90. In the curve diagrams of FIG. 8A and FIG. 8B, the horizontal axis indicates the system current ISYS supplied by the battery group BAT of the conventional power system 100 and by the battery group BAT of the multi-mode power system 300 of the present invention to the internal system 90, wherein the system current ISYS is in unit of ampere (A). In the curve diagrams of FIG. 8A and FIG. 8B, the longitudinal axis indicates the power conversion efficiency in unit of percentage (%) of the conventional power system 100 and of the multi-mode power system 300 of the present invention. As shown by the solid rectangular frame R1 and the solid rectangular frame R2 in FIG. 8A, because the multi-mode power system 300 of the present invention adopts the capacitive switching voltage-divider 320 (i.e., the first conversion circuit 320) and because the first switch Q1 is shared as a battery path switch of the battery module 310 and as a switching switch of the capacitive switching voltage-divider 320, as compared to the conventional power system 100 of FIG. 1, the multi-mode power system 300 of the present invention significantly enhances the power conversion efficiency in load conditions ranging from light load to heavy load. As shown by the solid rectangular frame R3 in FIG. 8b, due to the same reason as above, as compared to the conventional power system 102 of FIG. 2, the multi-mode power system 300 of the present invention significantly enhances the power conversion efficiency in heavy load condition.

Figure 9:
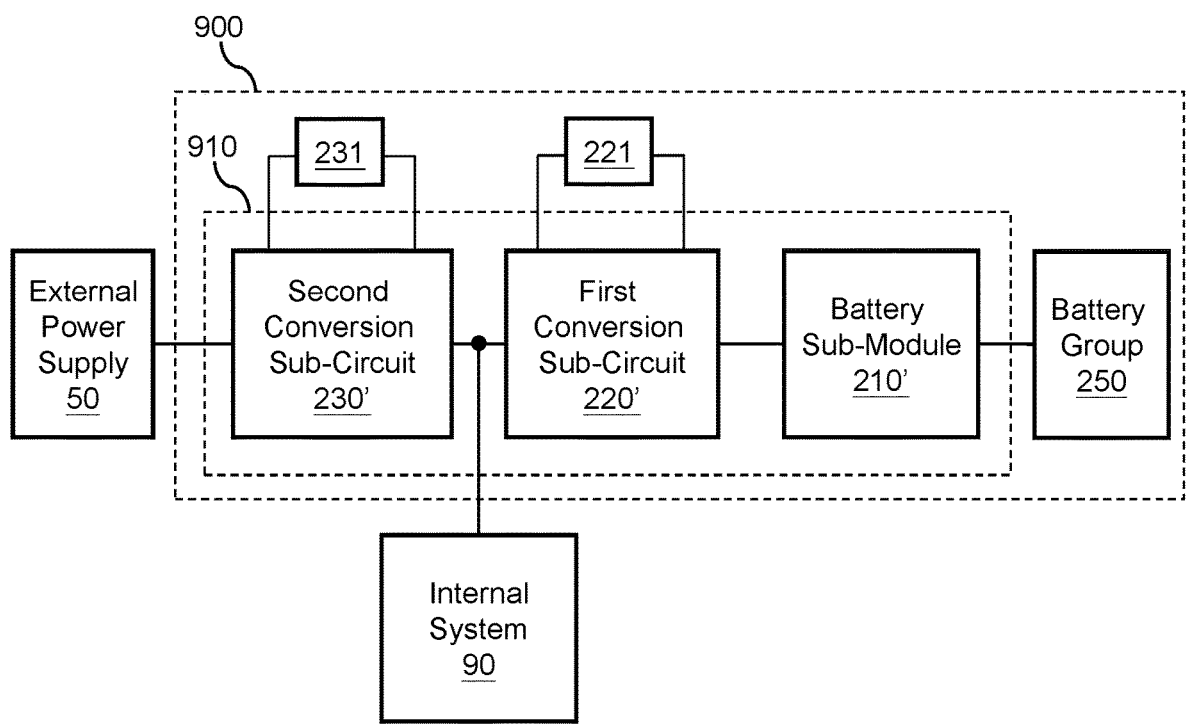
FIG. 9 shows a schematic diagram of a multi-mode power system and a power conversion circuit according to an embodiment of the present invention.

Please refer to FIG. 9, which shows a schematic diagram of a multi-mode power system 900 and a power conversion circuit 910 according to an embodiment of the present invention. The multi-mode power system 900 of FIG. 9 corresponds to another circuit partitioning configuration of the multi-mode power system 200 of FIG. 3, the multi-mode power system 300 of FIG. 4, or the multi-mode power system 600 of FIG. 6. The multi-mode power system 900 comprises: a power conversion circuit 910, an energy storage circuit 221, an energy storage circuit 231 and a battery group 250. The power conversion circuit 910 includes: a first conversion sub-circuit 220', a second conversion sub-circuit 230' and a battery sub-module 210'. The first conversion sub-circuit 220', the second conversion sub-circuit 230' and the battery sub-module 210' of FIG. 9 respectively correspond to the first conversion circuit 220, the second conversion circuit 230 and the battery module 210 of FIG. 3, FIG. 4 or FIG. 6, but the major power storage devices and the battery group BAT in FIG. 3, FIG. 4 or FIG. 6 are omitted in the multi-mode power system 900. Taking FIG. 4 as an example, when the multi-mode power system 300 of FIG. 4 is configured as the multi-mode power system 900 of FIG. 9, the energy storage circuit 221 in the multi-mode power system 900 corresponds to the capacitor CFLY; the energy storage circuit 231 in the multi-mode power system 900 corresponds to the inductor L; the battery group 250 in the multi-mode power system 900 corresponds to the battery group BAT. The first conversion sub-circuit 220' in the multi-mode power system 900 includes: a first switch Q1 (i.e., battery path switch Q1), a second switch Q2, a third switch Q3, a fourth switch Q4 and a first control circuit 321. The second conversion sub-circuit 230' includes: a fifth switch Q5, a sixth switch Q6 and a second control circuit 331. The battery sub-module 210' includes a battery path switch Q1. Likely, the multi-mode power system 200 and multi-mode power system 600 also can be configured as the multi-mode power system 300 in a similar way.

In one embodiment, the power conversion circuit 910 is integrated into an integrated circuit (IC) and/or an IC package.

In light of the above, as compared to the prior art shown in FIG. 1 and the prior art shown in FIG. 2, because the present invention arranges the system power for supplying power to the internal system 90 at an output end of the first conversion circuit 320 when the first conversion circuit 320 operates in the first outgoing mode and at an output end of the second conversion circuit 330 when the second conversion circuit 330 operates in the second incoming mode, the present invention can use one single switch to function as both the battery path switch of the battery module and a switching switch (i.e., the first switch Q1) of the first conversion circuit 320. Besides, in one embodiment, the battery path switch Q1 of the battery module 310 in the multi-mode power system 300 is always ON in the first bypass mode and is always OFF in the first OFF mode, and in the first incoming mode and in the first outgoing mode, the battery path switch Q1 is periodically switched along with other switches. As a result, the battery path switch Q1 not only serves as a control switch for controlling a path of the battery group BAT, but also serves as a switching switch for capacitive power conversion. Consequently, as compared to the prior arts, the present invention can reduce the required number of the total switches and the required number of other devices, and can effectively increase power conversion efficiency. Besides, the present invention can effectively enhance power conversion efficiency. Moreover, in a case where the multi-mode power system 300 of the present invention further adopts circuits in some embodiments (e.g., when the first conversion circuit 320 is a Dickson converter and when the second conversion circuit 330 is a 3-level buck converter), the charging efficiencies of the multi-mode power system 300 in different load conditions can be further enhanced.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A multi-mode power system, comprising:
   a battery module including: a battery path switch and a battery group which are connected in series to each other, wherein the battery group includes at least one battery;
   a first conversion circuit including: a plurality of switches and a first capacitor, wherein the plurality of switches are configured to operably switch a coupling relationship between the first capacitor and an internal system and a coupling relationship between the first capacitor and the battery module, so as to convert a power of the battery group to a system power, or, so as to convert the system power to the power of the battery group, wherein the plurality of switches of the first conversion circuit include the battery path switch, and wherein the system power is a direct current (DC) power, which is configured to operably supply power to the internal system; and
   a second conversion circuit including: another plurality of switches and an inductor, wherein the another plurality of switches are configured to operably switch a coupling relationship between the inductor and an external power supply and a coupling relationship between the inductor and the internal system, so as to convert the external power supply to the system power, or, so as to convert the system power to the external power supply;
   wherein the multi-mode power system operates in one of the following operation mode combinations:
   wherein when the first conversion circuit operates in a first outgoing mode or a first bypass mode, the second conversion circuit operates in a second incoming mode, a second outgoing mode or a second bypass mode; and
   wherein when the first conversion circuit operates in a first incoming mode, the second conversion circuit operates in the second incoming mode or the second bypass mode;
   wherein when the first conversion circuit operates in the first incoming mode, the plurality of switches periodically switch the coupling relationship between the first capacitor and the internal system and the coupling relationship between the first capacitor and the battery module, so as to convert the system power to the power of the battery group;
   wherein when the first conversion circuit operates in the first bypass mode, a part of the plurality of switches are always ON, so that a path between the system power and the power of the battery group is always ON, wherein the part of the plurality of switches include the battery path switch;
   wherein when the second conversion circuit operates in the second outgoing mode, the another plurality of switches periodically switch the coupling relationship between the inductor and the external power supply and the coupling relationship between the inductor and the internal system, so as to convert the system power to the external power supply;
   wherein when the second conversion circuit operates in the second incoming mode, the another plurality of switches periodically switch the coupling relationship between the inductor and the external power supply and the coupling relationship between the inductor and the internal system, so as to convert the external power supply to the system power; and
   wherein when the second conversion circuit operates in the second bypass mode, a part of the another plurality of switches are always ON, so that a path between the system power and the external power supply is always ON.

2. The multi-mode power system of claim 1, wherein the system power includes a system voltage, wherein a voltage of the battery group is greater than or equal to the system voltage, wherein a voltage of the external power supply is greater than or equal to the system voltage, and wherein the voltage of external power supply is greater than or equal to or smaller than the voltage of the battery group.

3. The multi-mode power system of claim 2, wherein when the first conversion circuit operates in the first incoming mode, the first conversion circuit is a charge pump, so that the voltage of the battery group is greater than the system voltage; and wherein when the first conversion circuit operates in the first outgoing mode, the first conversion circuit is a capacitive voltage-divider circuit, so that the voltage of the battery group is greater than the system voltage.

4. The multi-mode power system of claim 3, wherein the voltage of the battery group is 2-fold of the system voltage.

5. The multi-mode power system of claim 4, wherein the plurality of switches of the first conversion circuit include:
   a first switch having a first control end, a first opposite-phase output end and a first in-phase output end, wherein the first opposite-phase output end is coupled to the battery group;
   a second switch having a second control end, a second opposite-phase output end and a second in-phase output end, wherein the second opposite-phase output end is coupled to the first in-phase output end, wherein the second in-phase output end is coupled to the internal system;
   a third switch having a third control end, a third opposite-phase output end and a third in-phase output end, wherein the third opposite-phase output end is coupled between the second in-phase output end and the internal system;

a fourth switch having a fourth control end, a fourth opposite-phase output end and a fourth in-phase output end, wherein the fourth opposite-phase output end is coupled to the third in-phase output end, wherein the fourth in-phase output end is coupled to ground;

wherein a first end of the first capacitor is coupled between the first in-phase output end and the second opposite-phase output end, wherein a second end of the first capacitor is coupled between the third in-phase output end and the fourth opposite-phase output end;

wherein the first conversion circuit further includes: a first control circuit, which is configured to operably generate a first control signal, a second control signal, a third control signal, a fourth control signal, so as to control the first switch, the second switch, the third switch and the fourth switch, respectively; and wherein the first switch is the battery path switch.

6. The multi-mode power system of claim 5, wherein the first control circuit is configured to operate the plurality of switches via one or more of the following approaches:

wherein when the first conversion circuit operates in the first bypass mode, the first switch and the second switch are always ON, whereas, the third switch and the fourth switch are always OFF;

wherein when the first conversion circuit operates in the first outgoing mode or the first incoming mode, the first switch, the second switch, the third switch and the fourth switch are periodically switched between an ON state and an Off state, wherein when the first switch and the third switch are ON, the second switch and the fourth switch are OFF, and wherein when the first switch and the third switch are OFF, the second switch and the fourth switch are ON; and/or wherein when the first conversion circuit operates in the first OFF mode, the first switch and the second switch are always OFF.

7. The multi-mode power system of claim 2, wherein the first conversion circuit is a Dickson converter, wherein the voltage of the battery group is 2-fold, 3-fold or 4-fold of the system voltage.

8. The multi-mode power system of claim 2, wherein when the second conversion circuit operates in the second incoming mode, the second conversion circuit is a buck converter, so that the voltage of external power supply is greater than the system voltage; and wherein when the second conversion circuit operates in the second outgoing mode, the second conversion circuit is a boost converter, so that the voltage of external power supply is greater than the system voltage.

9. The multi-mode power system of claim 8, wherein the second conversion circuit executes conversion between the external power supply and the system power by at least 2-level pulse width modulation.

10. The multi-mode power system of claim 2, wherein the another plurality of switches of second conversion circuit include:

a fifth switch having a fifth control end, a fifth opposite-phase output end and a fifth in-phase output end, wherein the fifth in-phase output end is coupled to ground;

a sixth switch having a sixth control end, a sixth opposite-phase output end and a sixth in-phase output end, wherein the sixth opposite-phase output end is coupled to the external power supply, wherein the sixth in-phase output end is coupled to the fifth opposite-phase output end;

wherein a first end of the inductor is coupled between the sixth in-phase output end and the fifth opposite-phase output end, wherein a second end of the inductor is coupled among the second in-phase output end, the third opposite-phase output end and the internal system; and wherein the second conversion circuit further includes: a second control circuit, which is configured to operably generate a fifth control signal and a sixth control signal, so as to control the fifth switch and the sixth switch, respectively.

11. The multi-mode power system of claim 10, wherein the second control circuit is configured to operate the another plurality of switches via one or more of the following approaches:

wherein when the second conversion circuit operates in the second bypass mode, the sixth switch is always ON, whereas the fifth switch is always OFF;

wherein when the second conversion circuit operates in the second outgoing mode or the second incoming mode, the fifth switch and the sixth switch are periodically switched between an ON state and an Off state; wherein when the fifth switch is ON, the sixth switch is OFF; wherein when the fifth switch is OFF, the sixth switch is ON; and/or wherein when the second conversion circuit operates in a second OFF mode, the fifth switch and the sixth switch are always OFF.

12. The multi-mode power system of claim 10, wherein the another plurality of switches of second conversion circuit include:

a seventh switch having a seventh control end, a seventh opposite-phase output end and a seventh in-phase output end, wherein the seventh opposite-phase output end is coupled to the fifth in-phase output end, wherein the seventh in-phase output end is coupled to ground;

an eighth switch having a eighth control end, an eighth opposite-phase output end and an eighth in-phase output end, wherein the eighth in-phase output end is coupled to the sixth opposite-phase output end; and a second capacitor, wherein a first end of the second capacitor is coupled between the eighth in-phase output end and the sixth opposite-phase output end, wherein a second end of the second capacitor is coupled between the fifth in-phase output end and the seventh opposite-phase output end;

wherein the second control circuit is configured to operably generate a seventh control signal and an eighth control signal, so as to control the seventh switch and the eighth switch, respectively.

13. The multi-mode power system of claim 12, wherein the second control circuit is configured to operate the another plurality of switches further via one or more of the following approaches:

wherein when the second conversion circuit operates in the second bypass mode, the sixth switch and the eighth switch are always ON, whereas the fifth switch and the seventh switch are always OFF;

wherein when the second conversion circuit operates in the second outgoing mode or the second incoming mode, the fifth switch, the sixth switch, the seventh switch and the eighth switch are periodically switched between an ON state and an Off state; wherein when the fifth switch and the eighth switch are ON, the sixth switch and the seventh switch are OFF; wherein when the fifth switch and the eighth switch are OFF, the sixth switch and the seventh switch are ON; and/or wherein when the second conversion circuit operates in the second OFF mode, the fifth switch, the sixth switch, the seventh switch and the eighth switch are always OFF.

14. The multi-mode power system of claim 1, wherein the plurality of switches of the first conversion circuit and the another plurality of switches of the second conversion circuit are synchronously switched, and wherein a duty ratio of the plurality of switches of the first conversion circuit is correlated to a duty ratio of the another plurality of switches of the second conversion circuit.

15. The multi-mode power system of claim 1, wherein the operation mode combinations further include:
wherein when the first conversion circuit operates in a first OFF mode, the second conversion circuit operates in a second OFF mode, a second incoming mode or a second bypass mode; and
wherein when the second conversion circuit operates in a second OFF mode, the first conversion circuit operates in the first outgoing mode or the first bypass mode;
wherein when the first conversion circuit operates in the first OFF mode, the plurality of switches of the first conversion circuit are always OFF; and
wherein when the second conversion circuit operates in the second OFF mode, the another plurality of switches of the second conversion circuit are always OFF.

16. A power conversion circuit for use in a multi-mode power system, wherein the multi-mode power system includes: a first capacitor, an inductor and a battery group which are coupled to the power conversion circuit; the power conversion circuit comprising:
a battery sub-module including: a battery path switch and the battery group which are connected in series to each other;
a first conversion sub-circuit including a plurality of switches, wherein the plurality of switches are configured to operably switch a coupling relationship between the first capacitor and an internal system and a coupling relationship between the first capacitor and the battery module, so as to convert a power of the battery group to a system power for being supplied to the internal system, or, so as to convert the system power to the power of the battery group, wherein the plurality of switches of the first conversion circuit include the battery path switch; and
a second conversion sub-circuit including: another plurality of switches, wherein the another plurality of switches are configured to operably switch a coupling relationship between the inductor and an external power supply and a coupling relationship between the inductor and the internal system, so as to convert the external power supply to the system power, or, so as to convert the system power to the external power supply, wherein the system power is a direct current (DC) power, which is configured to operably supply power to the internal system;
wherein the power conversion circuit operates in one of a plurality of following operation mode combinations:
wherein when the first conversion sub-circuit operates in a first outgoing mode or a first bypass mode, the second conversion sub-circuit operates in a second incoming mode, a second outgoing mode or a second bypass mode; and
wherein when the first conversion sub-circuit operates in a first incoming mode, the second conversion sub-circuit operates in the second incoming mode or the second bypass mode;

wherein when the first conversion sub-circuit operates in the first incoming mode, the plurality of switches periodically switch the coupling relationship between the first capacitor and the internal system and the coupling relationship between the first capacitor and the battery module, so as to convert the system power to the power of the battery group;
wherein when the first conversion sub-circuit operates in the first bypass mode, a part of the plurality of switches are always ON, so that a path between the system power and the power of the battery group is always ON, wherein part of the plurality of switches include the battery path switch;
wherein when the second conversion sub-circuit operates in the second outgoing mode, the another plurality of switches periodically switch the coupling relationship between the inductor and the external power supply and the coupling relationship between the inductor and the internal system, so as to convert the system power to the external power supply;
wherein when the second conversion sub-circuit operates in the second incoming mode, the another plurality of switches periodically switch the coupling relationship between the inductor and the external power supply and the coupling relationship between the inductor and the internal system, so as to convert the external power supply to the system power; and
wherein when the second conversion sub-circuit operates in the second bypass mode, a part of the another plurality of switches are always ON, so that a path between the system power and the external power supply is always ON.

17. The multi-mode power system of claim 16, wherein the system power includes a system voltage, wherein a voltage of the battery group is greater than or equal to the system voltage; wherein a voltage of external power supply is greater than or equal to the system voltage; and wherein the voltage of external power supply is greater than or equal to or smaller than the voltage of the battery group.

18. The multi-mode power system of claim 17, wherein when the first conversion sub-circuit operates in the first incoming mode, the first conversion sub-circuit is a charge pump, so that the voltage of the battery group is greater than the system voltage; and wherein when the first conversion sub-circuit operates in the first outgoing mode, the first conversion sub-circuit is capacitive voltage-divider circuit, so that the voltage of the battery group is greater than the system voltage.

19. The multi-mode power system of claim 18, wherein the voltage of the battery group is 2-fold of the system voltage.

20. The multi-mode power system of claim 19, wherein the plurality of switches of the first conversion sub-circuit include:
a first switch having a first control end, a first opposite-phase output end and a first in-phase output end, wherein the first opposite-phase output end is coupled to the battery group;
a second switch having a second control end, a second opposite-phase output end and a second in-phase output end, wherein the second opposite-phase output end is coupled to the first in-phase output end, wherein the second in-phase output end is coupled to the internal system;
a third switch having a third control end, a third opposite-phase output end and a third in-phase output end, wherein the third opposite-phase output end is coupled between the second in-phase output end and the internal system;
a fourth switch having a fourth control end, a fourth opposite-phase output end and a fourth in-phase output end, wherein the fourth opposite-phase output end is coupled to the third in-phase output end, wherein the fourth in-phase output end is coupled to ground;
wherein a first end of the first capacitor is coupled between the first in-phase output end and the second opposite-phase output end, wherein a second end of the first capacitor is coupled between the third in-phase output end and the fourth opposite-phase output end;
wherein the first conversion sub-circuit further includes: a first control circuit, which is configured to operably generate a first control signal, a second control signal, a third control signal, a fourth control signal, so as to control the first switch, the second switch, the third switch and the fourth switch, respectively; and
wherein the first switch is the battery path switch.

21. The multi-mode power system of claim 20, wherein the first control circuit is configured to operate the plurality of switches via one or more of the following approaches:
wherein when the first conversion sub-circuit operates in the first bypass mode, the first switch and the second switch are always ON, whereas the third switch and the fourth switch are always OFF;
wherein when the first conversion sub-circuit operates in the first outgoing mode or the first incoming mode, the first switch, the second switch, the third switch and the fourth switch are periodically switched between an ON state and an Off state, wherein when the first switch and the third switch are ON, the second switch and the fourth switch are OFF; wherein when the first switch and the third switch are OFF, the second switch and the fourth switch are ON; and/or
wherein when the first conversion sub-circuit operates in the first OFF mode, the first switch and the second switch are always OFF.

22. The multi-mode power system of claim 18, wherein the first conversion sub-circuit is a Dickson converter, wherein the voltage of the battery group is 2-fold, 3-fold or 4-fold of the system voltage.

23. The multi-mode power system of claim 17, wherein when the second conversion sub-circuit operates in the second incoming mode, the second conversion sub-circuit is a buck converter, so that the voltage of external power supply is greater than the system voltage; and wherein when the second conversion sub-circuit operates in the second outgoing mode, the second conversion sub-circuit is a boost converter, so that the voltage of external power supply is greater than the system voltage.

24. The multi-mode power system of claim 23, wherein the second conversion sub-circuit executes conversion between the external power supply and the system power via at least 2-level pulse width modulation.

25. The multi-mode power system of claim 17, wherein the another plurality of switches of second conversion sub-circuit include:
a fifth switch having a fifth control end, a fifth opposite-phase output end and a fifth in-phase output end, wherein the fifth in-phase output end is coupled to ground;
a sixth switch having a sixth control end, a sixth opposite-phase output end and a sixth in-phase output end, wherein the sixth opposite-phase output end is coupled to the external power supply, wherein the sixth in-phase output end is coupled to the fifth opposite-phase output end;
wherein a first end of the inductor is coupled between the sixth in-phase output end and the fifth opposite-phase output end, wherein a second end of the inductor is coupled among the second in-phase output end, the third opposite-phase output end and the internal system; and
wherein the second conversion sub-circuit further includes: a second control circuit, which is configured to operably generate a fifth control signal and a sixth control signal, so as to control the fifth switch and the sixth switch, respectively.

26. The multi-mode power system of claim 25, wherein the second control circuit is configured to operate the another plurality of switches via one or more of the following approaches:
wherein when the second conversion sub-circuit operates in the first bypass mode, the sixth switch is always ON, whereas the fifth switch is always OFF;
wherein when the second conversion sub-circuit operates in the second outgoing mode or the second incoming mode, the fifth switch and the sixth switch are periodically switched between an ON state and an Off state; wherein when the fifth switch is ON, the sixth switch is OFF; wherein when the fifth switch is OFF, the sixth switch is ON; and/or
wherein when the second conversion sub-circuit operates in a second OFF mode, the fifth switch and the sixth switch are always OFF.

27. The multi-mode power system of claim 25, wherein the another plurality of switches of second conversion sub-circuit include:
a seventh switch having a seventh control end, a seventh opposite-phase output end and a seventh in-phase output end, wherein the seventh opposite-phase output end is coupled to the fifth in-phase output end, wherein in-phase output end is coupled to ground;
an eighth switch having a eighth control end, an eighth opposite-phase output end and an eighth in-phase output end, wherein the eighth in-phase output end is coupled to the sixth opposite-phase output end; and
a second capacitor, wherein a first end of the second capacitor is coupled between the eighth in-phase output end and the sixth opposite-phase output end, wherein a second end of the second capacitor is coupled between the fifth in-phase output end and the seventh opposite-phase output end;
wherein the second control circuit is configured to operably generate a seventh control signal and an eighth control signal, so as to control the seventh switch and the eighth switch, respectively.

28. The multi-mode power system of claim 27, wherein the second control circuit is configured to operate the another plurality of switches further via one or more of the following approaches:
wherein when the second conversion sub-circuit operates in the second bypass mode, the sixth switch and the eighth switch are always ON, whereas the fifth switch and the seventh switch are always OFF;
wherein when the second conversion sub-circuit operates in the second outgoing mode or the second incoming mode, the fifth switch, the sixth switch, the seventh switch and the eighth switch are periodically switched between an ON state and an Off state; wherein when the fifth switch and the eighth switch are ON, the sixth switch and the seventh switch are OFF; wherein when the fifth switch and the eighth switch are OFF, the sixth switch and the seventh switch are ON; and/or wherein when the second conversion sub-circuit operates in the second OFF mode, the fifth switch, the sixth switch, the seventh switch and the eighth switch are always OFF.

29. The multi-mode power system of claim 16, wherein the plurality of switches of the first conversion sub-circuit and the another plurality of switches of the second conversion sub-circuit are synchronously switched, and wherein a duty ratio of the plurality of switches of the first conversion sub-circuit is correlated to a duty ratio of the another plurality of switches of the second conversion sub-circuit.

30. The multi-mode power system of claim 16, wherein the operation mode combinations further include:

wherein when the first conversion sub-circuit operates in a first OFF mode, the second conversion sub-circuit operates in a second OFF mode, a second incoming mode or a second bypass mode; and wherein when the second conversion sub-circuit operates in a second OFF mode, the first conversion sub-circuit operates in the first outgoing mode or the first bypass mode;

wherein when the first conversion sub-circuit operates in the first OFF mode, the plurality of switches of the first conversion sub-circuit are always OFF; and wherein when the second conversion sub-circuit operates in the second OFF mode, the another plurality of switches of the second conversion sub-circuit are always OFF.

* * * * *